(12) United States Patent
Covington et al.

(10) Patent No.: US 7,627,186 B2
(45) Date of Patent: Dec. 1, 2009

(54) COMPRESSION SYSTEMS AND METHODS

(75) Inventors: C. David Covington, Fayetteville, AR (US); Charles Lally, Vista, CA (US); Sheng Li, San Diego, CA (US); Richard L. Moore, Escondido, CA (US); Iain Huntly-Playle, La Jolla, CA (US)

(73) Assignee: Avocent California Corporation, Escondido, CA (US)

( * ) Notice: Subject to any disclaimer, the term of this patent is extended or adjusted under 35 U.S.C. 154(b) by 691 days.

(21) Appl. No.: 10/947,191

(22) Filed: Sep. 23, 2004

(65) Prior Publication Data

US 2005/0104892 A1    May 19, 2005

Related U.S. Application Data

(60) Provisional application No. 60/519,610, filed on Nov. 14, 2003.

(51) Int. Cl.
*G06K 9/48* (2006.01)

(52) U.S. Cl. ...................................................... 382/242

(58) Field of Classification Search ................. 382/236, 382/242
See application file for complete search history.

(56) References Cited

U.S. PATENT DOCUMENTS

| 5,295,235 | A | * | 3/1994 | Newman | 345/619 |
| 5,751,450 | A | * | 5/1998 | Robinson | 358/504 |
| 6,404,927 | B1 | * | 6/2002 | Li et al. | 382/232 |
| 6,486,909 | B1 | * | 11/2002 | Pirim | 348/143 |

* cited by examiner

*Primary Examiner*—Aaron M Richer
*Assistant Examiner*—Kee M Tung
(74) *Attorney, Agent, or Firm*—Davidson Berquist Jackson & Gowdey LLP

(57) ABSTRACT

In a wireless keyboard-video-mouse ("KVM") system in which a remote computer accesses the video output data of a target computer, a method of providing video data from the target computer to the remote computer, a method includes compressing at least some of the video data using a line fitting compression scheme to produce at least one sequence of absolute coded pixel segments and relative coded pixel segments which combine to represent the video data; and providing the sequence of absolute coded pixel segments and relative coded pixel segments to the remote computer.

16 Claims, 19 Drawing Sheets

COMPRESSION SYSTEMS AND METHODS

RELATED APPLICATIONS

This application is related to and claims priority from U.S. Provisional patent application No. 60/519,610, filed Nov. 14, 2003, the contents of which are incorporated herein by reference; and from U.S. patent application Ser. No. 10/883,993, filed Jul. 6, 2004, the contents of which are incorporated herein by reference.

FIELD OF THE INVENTION

This invention relates to the field of computer data processing, and, more specifically, to data processing using wireless-based keyboard-video-mouse ("KVM") systems.

BACKGROUND

Systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output, and hear the audio output of the target computer. These types of systems are typically called keyboard-video-mouse (KVM) systems.

Traditional KVM systems rely on wired technology to connect remote and target computers. It is, however, sometimes desirable to allow wireless connection between remote stations and target computers (included as part of a target system). For example, in addition to minimizing the number of actual wires needed in a KVM system, a wireless KVM system allows for target systems and remote stations to be added to the system without the addition of switches or wires.

In order for a remote computer to control the operation of a target computer, it is desirable that the video display of the remote computer keep up, in essentially real-time, with the display of the target computer. However, large amounts of data are required to keep the remote computer's video display current. However, transmitting, for instance, XGA resolution video at 8 bits resolution for each color with a frame rate of 30 frames/second results in a channel bandwidth requirement of 566 Mbits/sec which is prohibitive on most media. Accordingly, it is desirable to efficiently compress the video data being sent from the target computer to the remote computer in a manner that presents both an acceptable image to the target display and, at the same time, does not create significant delay between the creation and transmission of the video data.

BRIEF DESCRIPTION OF THE DRAWINGS

Exemplary embodiments of the invention are illustrated in the accompanying drawings in which like references indicate similar or corresponding elements and in which.

DETAILED DESCRIPTION OF PRESENTLY PREFERRED EXEMPLARY EMBODIMENTS OF THE INVENTION

Figure 1A:
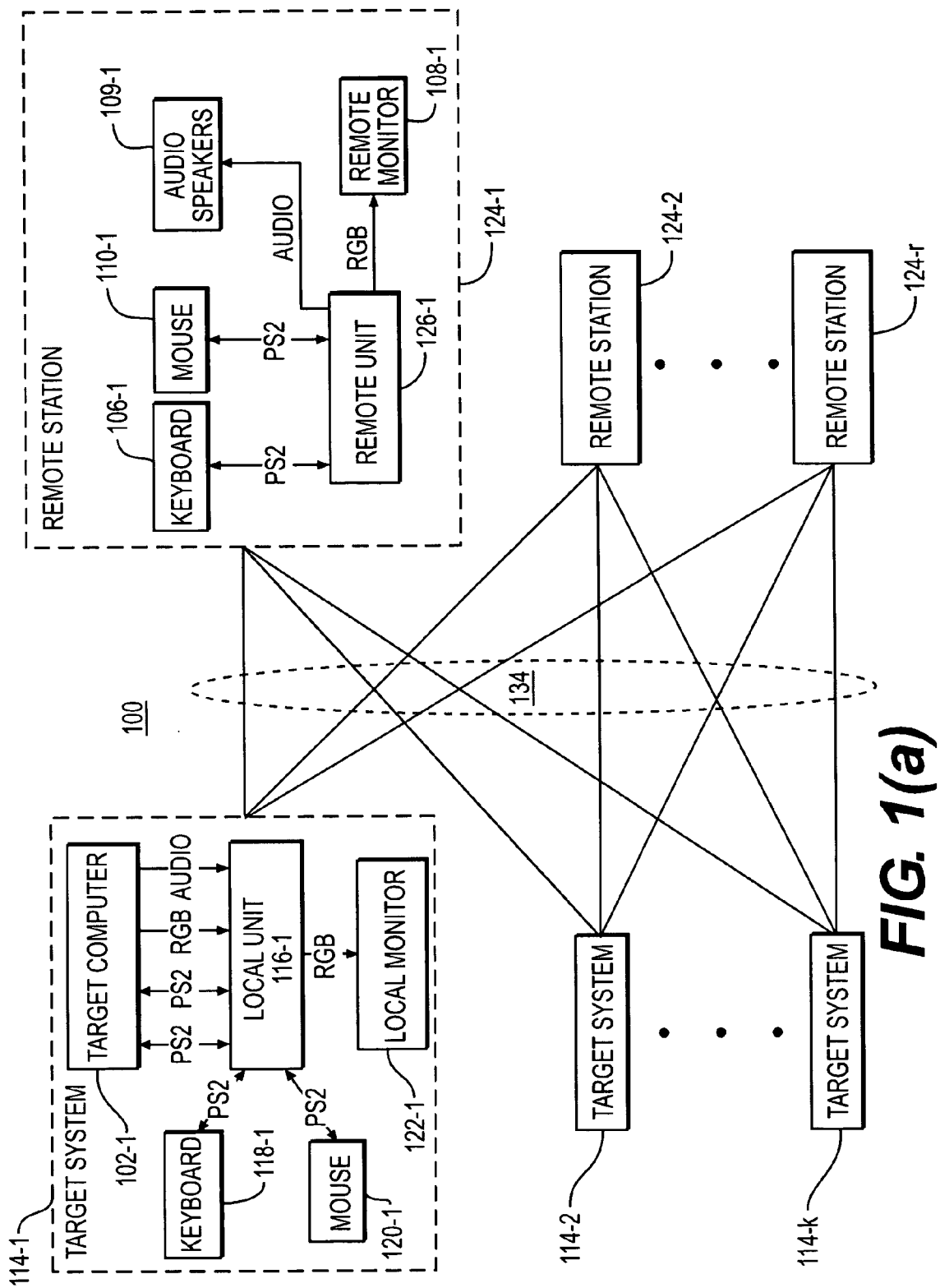
FIGS. 1(a)-1(c) are schematic representations of exemplary embodiments of the present invention.

A typical KVM system 100 according to embodiments of the present invention is shown in FIG. 1(a), where one or more target systems 114-1 . . . 114-k are controlled or accessed by one or more remote stations 124-1, 124-2, . . . , 124-r (generally 124). Each target system 114 includes a target computer 102 with associated and attached local unit 116. Each remote station 124 generally includes a remote unit 126, a keyboard 106, a video monitor 108, audio speakers 109 and a mouse (or similar point-and-click device) 110, although some remote stations may only include a video display 108 and a remote unit 126 or audio speakers 109 and a remote unit. (For reference, the remote unit, audio speakers, keyboard, mouse and video monitor of the remote station 124-x are referred to as remote unit 126-x, keyboard 106-x, monitor 108-x, audio speakers 109-x, and mouse 110-x respectively.) Operation of a particular target computer 102-i may be remotely viewed on the video monitor 108 of any of the remote stations 124, the audio heard on the speakers 109 of a remote station, and the keyboard 106 and mouse 110 of the remote station 124 may be used to provide keyboard and mouse input to the target computer 102-i. As shown in FIG. 1(a), in a typical KVM system 100 according to the present invention, a remote station 124 is able to control or access more than one target computer. Note that the lines drawn between target systems and remote stations in FIG. 1(a) represent potential (and not necessarily actual) wireless (RF) links between those sides. Thus, each target computer 102 may be controlled or accessed by more than one remote station 124, and each remote station 124 may control more than one target computer 102. The remote station, in a typical system, may be located within several hundred feet of the target system.

The present invention provides wireless KVM systems and mechanisms that support such systems. In the discussion that follows, the computer or system being controlled or accessed is generally referred to as the target computer or the target system. In some instances, the target computer is also referred to as the local computer. The system that is being used to access or control the target (local) computer is generally referred to herein as the remote system. For convenience of description, components on or connected directly to the target computer are referred to herein as "local", whereas components that are on or connected directly to the remote system are referred to herein as "remote." Additionally, as used herein, in certain contexts, the target system is considered to be a video transmitter or sending unit, and the remote system is the video receiving unit or receiver, although both units transmit and receive. Video and audio travel from target system to remote station, while keyboard and mouse data move from remote station to target system.

As shown in FIG. 1(a) the local or target system 114 includes a target computer 102 and an associated local unit 116. The local system 114 may also include a keyboard 118, a mouse (or other point-and-click-type device) 120 and a local monitor 122, each connected to the local unit 116 directly. The remote station 124 includes a remote unit 126. Additionally, the remote station 124 includes a keyboard 106, a mouse (or other point-and-click-type device) 110, a remote monitor 108 and a set of stereo audio speakers 109 The local or target computer 102 may be a computer, a server, a processor or other collection of processors or logic elements. Generally, as contemplated by the inventors, and as one skilled in the art would recognize, a target computer may be any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers may, e.g., be a collection of servers in a rack or some other collection, they may be independent of each other or connected to each other in a network or by some other structure. The local and remote monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, there will preferably be a direct electrical connection between the target computer 102 and the local unit 116.

Various components on the local/target system 114 communicate wirelessly with components on the remote station 124 via a wireless connection link 134. The wireless connection or link 134 preferably follows the IEEE 802.11a standard protocol, although one skilled in the art will realize that other protocols and methods of wireless communication are within the scope of the invention.

The local unit 116 receives local mouse and keyboard signals, e.g., as PS2 signals. These signals are provided by the local unit 116 to the target computer 102. The target computer 102 generates video output signals, e.g., RGB (Red, Green, Blue) signals, which are provided to the local unit 116 which, in turn, provides the signals to drive the local monitor 122. The target computer 102 may also generate audio output signals which are provided to the local unit 116. As noted, the target computer 102 need not have a keyboard, mouse or monitor, and may be controlled entirely by a remote computer.

Local unit 116 transmits image and audio data for transmission to a remote station (e.g., remote unit 126). Some or all of the data may be compressed before being transmitted. Additionally, local unit 116 may receive mouse and keyboard data (from a remote station), which is then provided to the local/target computer 102. The target computer 102 may execute the data received and may display output on its local monitor 122.

The remote station 124 receives video data from the local unit 116 of the target computer 102, preferably wirelessly (e.g., via an 802.11a wireless connection 134). The remote unit 126 receives (possibly compressed) video and audio data (not all of the data need be compressed) from the local unit 116. The remote unit 126 decompresses (as necessary) the video and audio data from the local unit 116 and provides it to the appropriate rendering device, e.g., to the remote monitor 108, which displays the video data, and to the remote speakers 109, respectively. Additionally, remote mouse 110 and keyboard 106 may be used to generate appropriate signals (e.g., PS2 signals) that may be transmitted via remote unit 126 to local unit 116 for execution on target computer 102.

Figure 1B:
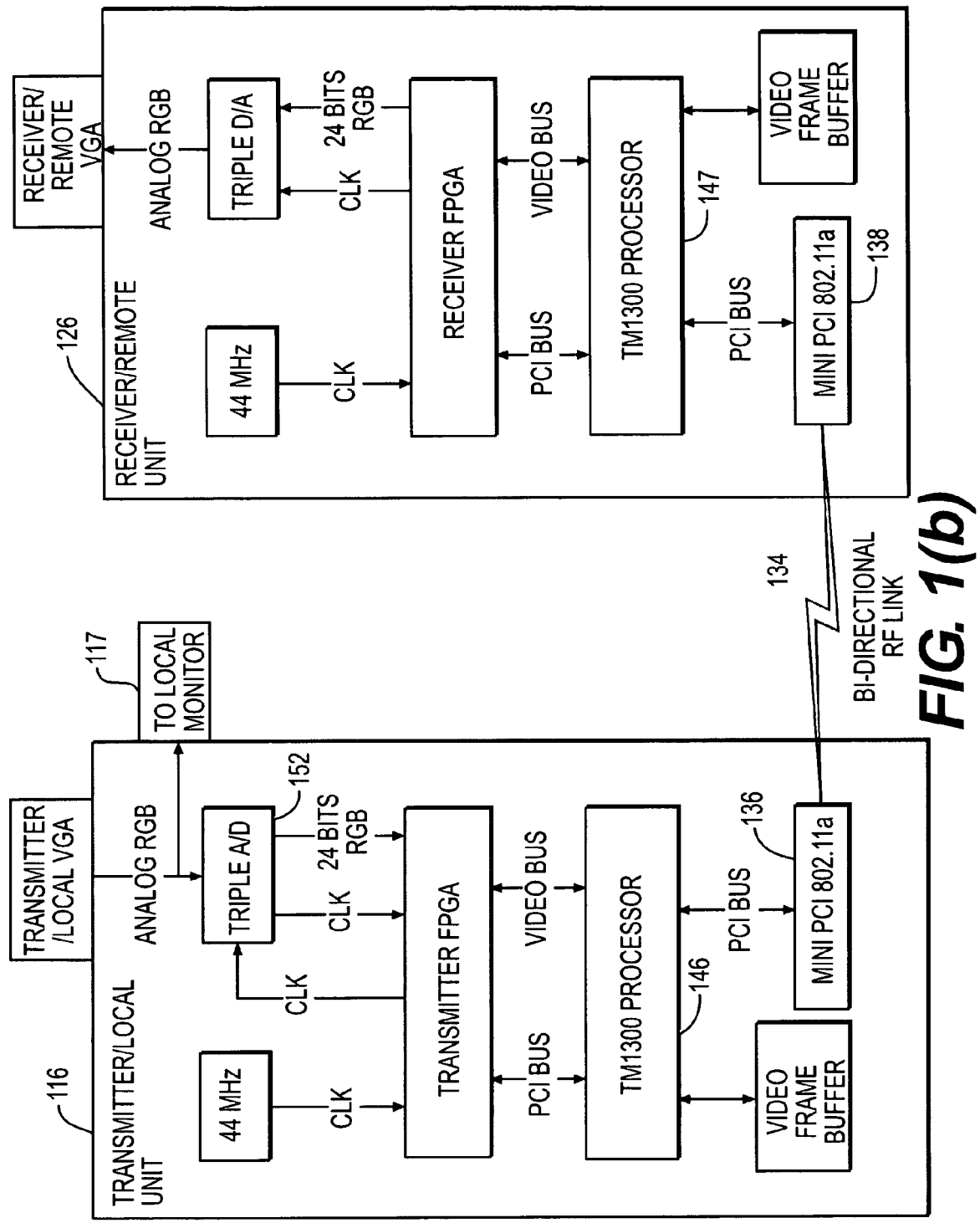
Figure 1C:
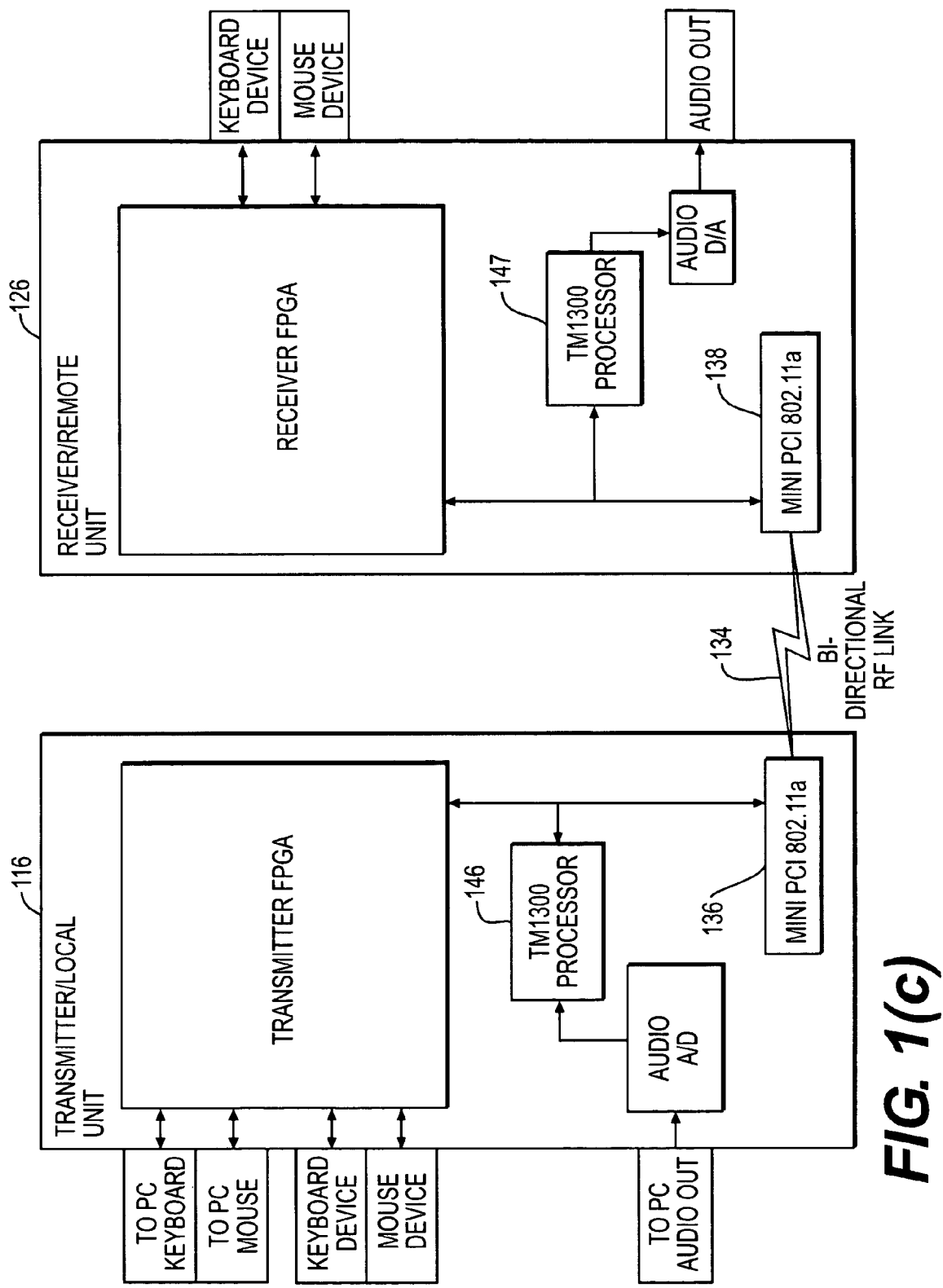

FIG. 1(b) is a block diagram depicting aspects of a video system according to embodiments of the present invention, indicating transmitter (local) unit 116 and receiver (remote) unit 126. FIG. 1(c) is a block diagram showing aspects of a keyboard, mouse, and audio system according to embodiments of the present invention for the local and remote units 116, 126, respectively.

With reference to FIGS. 1(b)-1(c), in operation, the system transmits video and possibly audio signals from an attached computer 102 from the transmitter (local) unit 116 to a receiver (remote) unit 126. In presently preferred embodiments, the units are in range of an 802.11a wireless radio link 134 between their respective wireless (Mini PCI 802.11a) cards 136 and 138. Those skilled in the art would understand that different types of wireless links will give different acceptable distance ranges. The system also communicates keyboard and mouse control information from the receiver/remote unit 126 back to the transmitter/local unit 116. Keyboard and mouse connections at the transmitter allow control of the computer 102 at the transmitter unit as well as the receiver unit. In addition, there may be a monitor port 117 on the transmitter to view the video signal before transmission.

The transmitter/local unit 116 attaches to a computer 102 via video and audio output connectors and keyboard and mouse input connectors as indicated in FIG. 1(c). Local unit 116 and remote unit 126, via wireless link 134, provide a path for keyboard and mouse control signals to flow from keyboard device and mouse device ports on remote unit 126 to the corresponding ports on local unit 116 connected to target computer 102. In addition, local unit 116 and remote unit 126, via wireless link 134, provide a channel for analog audio information to flow from target computer 102 through local unit 116, wireless link 134, remote unit 126, connecting to the audio out port of remote unit 126. The audio out port drives an attached speaker as if it were connected to target computer 102.

The transmitter 116 digitizes and compresses the analog video input to reduce radio bandwidth requirements. Details of the various compression algorithms used by various embodiments appear below (and in co-pending application Ser. No. 10/883,993, filed Jul. 6, 2004, the contents of which are incorporated herein by reference). In some embodiments, compression occurs pixel to pixel, with a line-fitting algorithm generating video segments with length up to nine pixels. Compression may also occur between frames such that the transmitter unit 116 sends only the part of a line changed between frames, from the first pixel that is different to the end of the line. This strategy is referred to herein as the Left Margin algorithm (described in greater detail below). A user at the receiver 126 may adjust video parameters either manually or automatically using an On Screen Display (OSD) in the receiver driven by the attached keyboard 106 and mouse 110 and observed on the receiver monitor 108.

Line Fitting Compression Algorithm

In order to reduce bandwidth requirements, the system compresses the video, preferably in the transmitter Field Programmable Gate Array ("FPGA") 150, as it is being received from the A/D converter 152. In presently preferred embodiments, the FPGA 150 may not be able to store an entire frame, so it forwards compressed video to the CPU (TM1300 Processor) in a stream as each line is received. The transmitter unit 116 packs the compressed video frame into packets and sends them to the receiver unit 126 (over wireless link 134), which decompresses and possibly displays the video.

In presently preferred embodiments, the transmitter unit 116 accomplishes digital video compression in the FPGA 150. In presently preferred embodiments, input video consists of 24-bit pixel codes from the video A/D converter 152 with eight bits allocated to each of red, green, and blue color components. The compressor analyzes consecutive pixel samples attempting to fit a line segment to the data within a difference threshold criterion between points on the line and original pixel values. Line segments may be up to nine pixels in length and are encoded with a starting point to endpoint difference in any color of less than 28 on a scale of 0 to 255 in each of red, green, and blue.

Figure 2A:
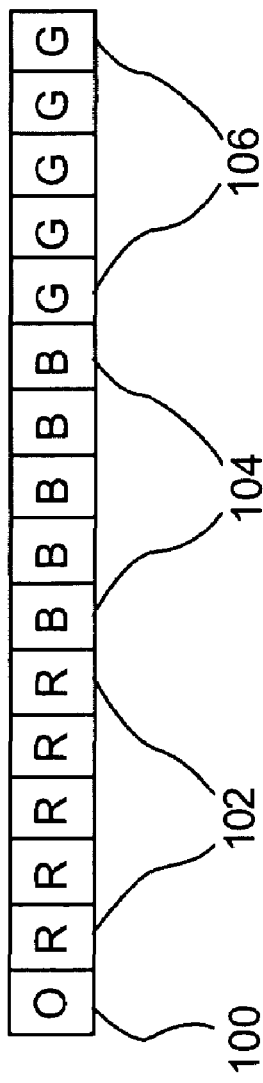
FIGS. 2(a)-2(b) depict exemplary formats of data encoding segments according to embodiments of the present invention.
Figure 2B:
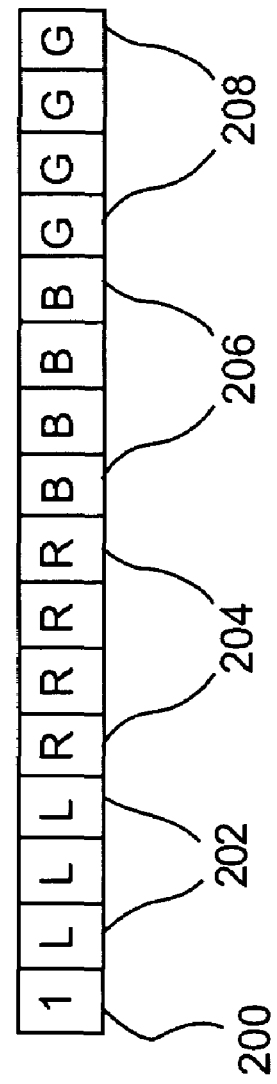

The compression process produces two segment code types: (i) an absolute segment of length one representing a single pixel encoding the top five bits of each color component totaling 15 bits, and (ii) a relative segment representing a sequence of pixels of length two to nine. The relative endpoint is computed using pixel component differences using the top six bits of each component. A 16-th bit in the first bit position distinguishes between the absolute and relative formats. Each line representation starts with an absolute code, and a mixture of absolute and relative coded segments follow. FIGS. 2(a) and 2(b) show the two segment formats. The absolute segment represents a single pixel. The relative segment represents from two to nine pixels.

FIG. 2(a) shows the representation of an absolute segment, as indicated by the leading "0" in field 100. Each field "RRRRR" (102), "BBBBB" (104), and "GGGGG" (106) is a value in the range 0 to 31, representing the top five bits of an unsigned 8-bit pixel component for the red, blue and green signals, respectively.

FIG. 2(b) shows a relative coded segment, as indicated by the leading "1" in field 200. The "LLL" in field 202 encodes values from 0 to 7 representing segment lengths two to nine respectively. Each field "RRRR" (204), "BBBB" (206), and "GGGG" (206) represents a signed delta value of the difference between the starting point and ending point of the segment in a 6-bit representation. The 6-bit precision represents the most significant bits of the 8-bit R, G, and B values. Delta values are coded in two's complement form and range from −7 to 7 (with −8 not being used to assure symmetry).

The algorithm seeks to causally construct line segments according to the following criteria:

(a) The sequential arrival of each new data point results in a decision to either output an absolute coded point or to create or extend a relative segment.

(b) The difference in any color component between the starting point and the endpoint does not exceed the maximum difference that can be encoded in a relative segment, specifically plus or minus 7 on a scale of 0 to 63, or plus or minus 28 on a scale of 0 to 255.

(c) Each new point added to a developing segment must fall within a minimum and maximum slope requirement. Each point added to the segment creates an additional slope range that must be satisfied. Given a starting point $p_1=(x_1, y_1)$ and an intermediate point $p_n=(x_n, y_n)$, all subsequent points beginning with $p_{n+1}$ added to the segment must fall within an area bounded by two rays: from $p_1$ through $(x_n, y_n-\Delta)$ and from $p_1$ through $(x_n, y_n+\Delta)$, where $\Delta$ is a design constant.

In the presently preferred embodiment, the value of $\Delta$ is constant. The value of $\Delta=3$ was empirically determined by running software simulating the compression and decompression processes with typical computer screen images as video input. The value of $\Delta$ was then adjusted to the highest value giving visually acceptable video fidelity. Greater values of $\Delta$ cause sharp edges in the image to be extended or shadowed, commonly occurring around borders and text characters.

Consistent with real-time design requirements, the encoding process must be causal, requiring that the decision to include a new pixel in an emerging segment must be based only on present and past pixel values. The second criterion results from the fact that the relative segment format can encode a difference spanning only a fraction of the entire range of values in each component. Thus a new data point with pixel value too different in any color component will terminate a segment in process and output an absolute segment based on the pixel value that broke the segment in process. Due to the length coding of relative segments, the arrival of a ninth point in a segment in process finalizes the segment since the maximum segment length has been reached.

Figure 3:
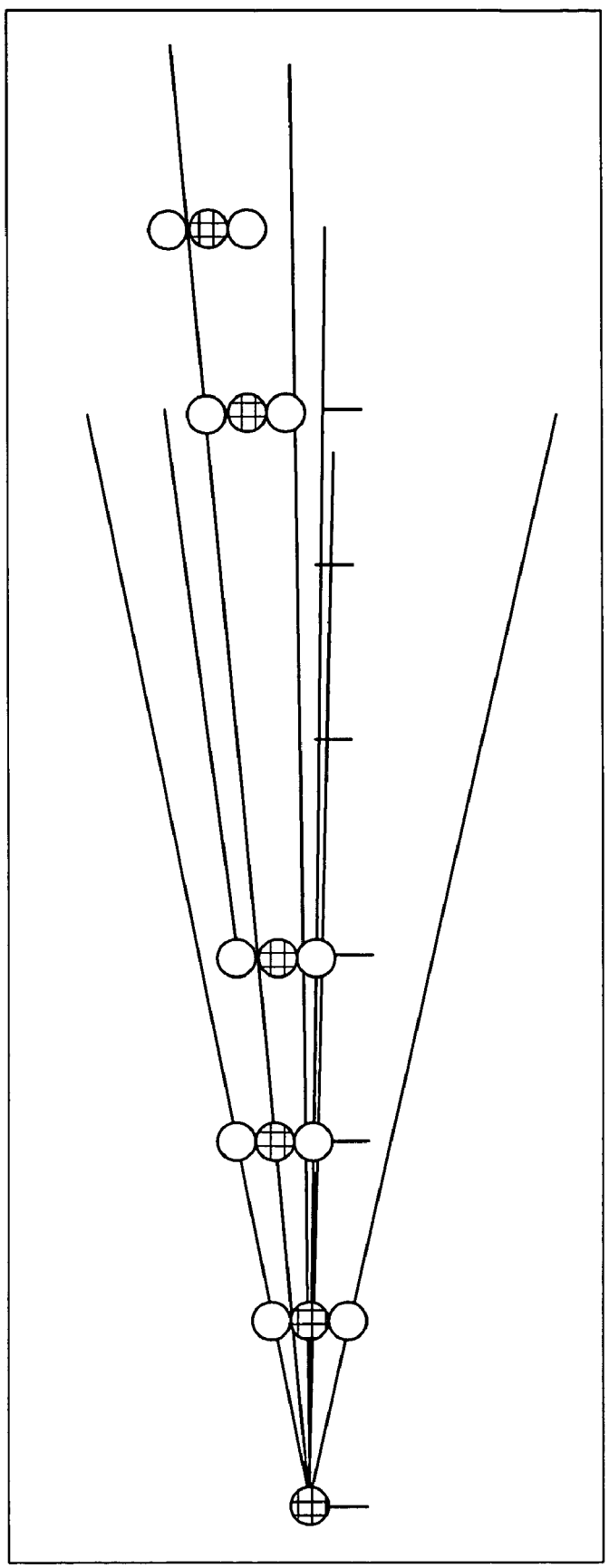
FIG. 3 is an exemplary diagram of causally connected line segments according to embodiments of the line compression algorithm.

The third criterion requires that line segments generated replace points that fit well to the line and do not form a curve. Allowing a curve to be encoded as a straight section would create excessive distortion in the video image. FIG. 3 shows the visual constraints that develop as the segment grows. Shaded circles represent pixel values from the video source. Clear circles represent points above and below the input pixel values that define the high and low slope limit rays. (In order to keep FIG. 3 from appearing too cluttered, only some of the slope limit lines are drawn.) Note the number of limit constraints is $2(N-1)$, where N is the number of pixels in the segment.

Creating a mathematical basis for the linearity requirement results in the following system of equations. The first point in the segment is accepted. The second point is also accepted, since there can be no curvature until there are at least three points. The second point does create the first pair of constraint lines. The third point must fall between the two rays created by the second point. The following system of equations combines the two inequalities using an absolute value operator. Note that the number of constraints to apply to each subsequent point grows linearly, so that the cumulative number of constraints generated grows quadratically.

$N = 1$   input $Y_1$ $N = 2$   input $Y_2$   compute $\lambda_1 = Y_2 - Y_1$ $N = 3$   input $Y_3$   compute $\lambda_2 = Y_3 - Y_1$   compare
$|Y_3 - (Y_1 + 2\lambda_1)| < 2\delta$ $N = 4$   input $Y_4$   compute $\lambda_3 = Y_4 - Y_1$   compare
$|Y_4 - (Y_1 + 3\lambda_1)| < 3\delta$
compare
$|Y_4 - (Y_1 + 1.5\lambda_2)| < 1.5\delta$ $N = 5$   input $Y_5$   compute $\lambda_4 = Y_5 - Y_1$   compare
$|Y_5 - (Y_1 + 4\lambda_1)| < 4\delta$
compare -continued $$|Y_5 - (Y_1 + 2\lambda_2)| < 2\delta$$
compare
$$|Y_5 - (Y_1 + 1.33\lambda_3)| < 1.33\delta$$

The $\lambda_i$ values represent the nominal slope created by the i-th point. The single $\delta$ value is constant throughout and is the design tolerance used to accept or reject an additional pixel based on the curvature it creates. Substituting the $\lambda_i$'s into the constraint equations yield the simplified equations:

N = 3  input $Y_3$  compute $\lambda_2 = Y_3 - Y_1$  compare $|Y_3 - 2Y_2 + Y_1| < 2\delta$
N = 4  input $Y_4$  compute $\lambda_3 = Y_4 - Y_1$  compare
$$|Y_4 - 3Y_2 + 2Y_1| < 3\delta$$
compare
$$|Y_4 - 1.5Y_3 + 0.5Y_1| < 1.5\delta$$
N = 5  input $Y_5$  compute $\lambda_4 = Y_5 - Y_1$  compare
$$|Y_5 - 4Y_2 + 3Y_1| < 4\delta$$
compare $|Y_5 - 2Y_3 + Y_1| < 2\delta$
compare
$$|Y_5 - 1.33Y_4 + 0.33Y_1| < 1.33\delta$$

and clearing fractions yields

N = 3  input $Y_3$  compute $\lambda_2 = Y_3 - Y_1$  compare $|Y_3 - 2Y_2 + Y_1| < 2\delta$
N = 4  input $Y_4$  compute $\lambda_3 = Y_4 - Y_1$  compare
$$|Y_4 - 3Y_2 + 2Y_1| < 3\delta$$
compare
$$|2Y_4 - 3Y_3 + Y_1| < 3\delta$$
N = 5  input $Y_5$  compute $\lambda_4 = Y_5 - Y_1$  compare
$$|Y_5 - 4Y_2 + 3Y_1| < 4\delta$$
compare
$$|2Y_5 - 4Y_3 + 2Y_1| < 4\delta$$
compare
$$|3Y_5 - 4Y_4 + Y_1| < 4\delta.$$

The last equations can be easily implemented in integer hardware, however the complexity is high. This becomes more of an issue as the number of points is expanded in a relative segment to nine, generating a total of 28 constraint equations to evaluate.

Considering the coefficients in each constraint equation to represent the corresponding Finite Impulse Response ("FIR") filter, note that the sum of the coefficients is zero. In terms of an FIR filter, the DC response is zero. Also, the pattern of the sign is always positive, negative, positive. These properties are consistent with second order curvature metrics. Showing just the coefficients in Table 1 below produces the following system of constraints generated by the second data point and applying to all subsequent points, as shown below in Table 1.

TABLE 1

| Y1 | Y2 | Y3 | Y4 | Y5 | Y6 | Y7 | Y8 | Y9 |
|----|----|----|----|----|----|----|----|----|
| 1  | −2 | 1  |    |    |    |    |    |    |
| 2  | −3 | 0  | 1  |    |    |    |    |    |
| 3  | −4 | 0  | 0  | 1  |    |    |    |    |
| 4  | −5 | 0  | 0  | 0  | 1  |    |    |    |
| 5  | −6 | 0  | 0  | 0  | 0  | 1  |    |    |
| 6  | −7 | 0  | 0  | 0  | 0  | 0  | 1  |    |
| 7  | −8 | 0  | 0  | 0  | 0  | 0  | 0  | 1  |

Continuing to show the constraints for points 4 through 8 gives the following sets of coefficients shown in Tables 2-7, respectively.

TABLE 2

N = 4

| Y1  | Y2 | Y3   | Y4 | Y5 | Y6 | Y7 | Y8 | Y9 |
|-----|----|------|----|----|----|----|----|----|
| 0.5 | 0  | −1.5 | 1  |    |    |    |    |    |
| 1   | 0  | −2   | 0  | 1  |    |    |    |    |
| 1.5 | 0  | −2.5 | 0  | 0  | 1  |    |    |    |
| 2   | 0  | −3   | 0  | 0  | 0  | 1  |    |    |
| 2.5 | 0  | −3.5 | 0  | 0  | 0  | 0  | 1  |    |
| 3   | 0  | −4   | 0  | 0  | 0  | 0  | 0  | 1  |

TABLE 3

N = 5

| Y1   | Y2 | Y3 | Y4    | Y5 | Y6 | Y7 | Y8 | Y9 |
|------|----|----|-------|----|----|----|----|----|
| 0.33 | 0  | 0  | −1.33 | 1  |    |    |    |    |
| 0.67 | 0  | 0  | −1.67 | 0  | 1  |    |    |    |
| 1    | 0  | 0  | −2    | 0  | 0  | 1  |    |    |
| 1.33 | 0  | 0  | −2.33 | 0  | 0  | 0  | 1  |    |
| 1.67 | 0  | 0  | −2.67 | 0  | 0  | 0  | 0  | 1  |

TABLE 4

N = 6

| Y1   | Y2 | Y3 | Y4 | Y5    | Y6 | Y7 | Y8 | Y9 |
|------|----|----|----|-------|----|----|----|----|
| 0.25 | 0  | 0  | 0  | −1.25 | 1  |    |    |    |
| 0.5  | 0  | 0  | 0  | −1.5  | 0  | 1  |    |    |
| 0.75 | 0  | 0  | 0  | −1.75 | 0  | 0  | 1  |    |
| 1    | 0  | 0  | 0  | −2    | 0  | 0  | 0  | 1  |

TABLE 5

N = 7

| Y1  | Y2 | Y3 | Y4 | Y5 | Y6   | Y7 | Y8 | Y9 |
|-----|----|----|----|----|------|----|----|----|
| 0.2 | 0  | 0  | 0  | 0  | −1.2 | 1  |    |    |
| 0.4 | 0  | 0  | 0  | 0  | −1.4 | 0  | 1  |    |
| 0.6 | 0  | 0  | 0  | 0  | −1.6 | 0  | 0  | 1  |

TABLE 6

N = 8

| Y1   | Y2 | Y3 | Y4 | Y5 | Y6 | Y7    | Y8 | Y9 |
|------|----|----|----|----|----|-------|----|----|
| 0.17 | 0  | 0  | 0  | 0  | 0  | −1.17 | 1  |    |
| 0.33 | 0  | 0  | 0  | 0  | 0  | −1.33 | 0  | 1  |

TABLE 7

N = 9

| Y1   | Y2 | Y3 | Y4 | Y5 | Y6 | Y7 | Y8    | Y9 |
|------|----|----|----|----|----|----|-------|----|
| 0.14 | 0  | 0  | 0  | 0  | 0  | 0  | −1.14 | 1  |

Combining all the coefficient systems into a single list and sorting by length reveals recurring patterns. The pattern 1, −2, 1 occurs four times. It is simply spaced out with zeros, more zeros every time it occurs. The pattern 2, −3, 0, 1 and its mirror image 0.5, 0, −1.5, 1 (also halved) occur also four times. This data is represented below in Table 8.

TABLE 8

| Y1 | Y2 | Y3 | Y4 | Y5 | Y6 | Y7 | Y8 | Y9 | Length |
|---|---|---|---|---|---|---|---|---|---|
| 1 | −2 | 1 | | | | | | | 3 |
| 0.5 | 0 | −1.5 | 1 | | | | | | 4 |
| 2 | −3 | 0 | 1 | | | | | | 4 |
| 0.33 | 0 | 0 | −1.33 | 1 | | | | | 5 |
| 1 | 0 | −2 | 0 | 1 | | | | | 5 |
| 3 | −4 | 0 | 0 | 1 | | | | | 5 |
| 0.25 | 0 | 0 | 0 | −1.25 | 1 | | | | 6 |
| 0.67 | 0 | 0 | −1.67 | 0 | 1 | | | | 6 |
| 1.5 | 0 | −2.5 | 0 | 0 | 1 | | | | 6 |
| 4 | −5 | 0 | 0 | 0 | 1 | | | | 6 |
| 0.2 | 0 | 0 | 0 | 0 | −1.2 | 1 | | | 7 |
| 0.5 | 0 | 0 | 0 | −1.5 | 0 | 1 | | | 7 |
| 1 | 0 | 0 | −2 | 0 | 0 | 1 | | | 7 |
| 5 | −6 | 0 | 0 | 0 | 0 | 1 | | | 7 |
| 0.17 | 0 | 0 | 0 | 0 | 0 | −1.17 | 1 | | 8 |
| 0.4 | 0 | 0 | 0 | 0 | −1.4 | 0 | 1 | | 8 |
| 0.75 | 0 | 0 | 0 | −1.75 | 0 | 0 | 1 | | 8 |
| 1.33 | 0 | 0 | −2.33 | 0 | 0 | 0 | 1 | | 8 |
| 2.5 | 0 | −3.5 | 0 | 0 | 0 | 0 | 1 | | 8 |
| 6 | −7 | 0 | 0 | 0 | 0 | 0 | 1 | | 8 |
| 0.14 | 0 | 0 | 0 | 0 | 0 | 0 | −1.14 | 1 | 9 |
| 0.33 | 0 | 0 | 0 | 0 | 0 | −1.33 | 0 | 1 | 9 |
| 0.6 | 0 | 0 | 0 | 0 | −1.6 | 0 | 0 | 1 | 9 |
| 1 | 0 | 0 | 0 | −2 | 0 | 0 | 0 | 1 | 9 |
| 1.67 | 0 | 0 | −2.67 | 0 | 0 | 0 | 0 | 1 | 9 |
| 3 | 0 | −4 | 0 | 0 | 0 | 0 | 0 | 1 | 9 |
| 7 | −8 | 0 | 0 | 0 | 0 | 0 | 0 | 1 | 9 |

The coefficient pattern 1, −2, 1 is well known to be the central second order difference operator or discrete Laplacian $\nabla^2 f_p = f_{p+1} - 2f_p + f_{p-1}$. See, e.g., *CRC Standard Mathematical Tables*, 27$^{th}$ ed., p. 427, Chapter XI. Numerical Methods, section Finite Differences. In reality, only some of the curvature tests in Table 8 need to be applied. There is generally a requirement to measure curvature on a variety of scales to confirm that pixel values in the input data from three points some distance apart fit well to a line as well as three points that are close together.

Thus, in preferred embodiments of the invention, the set of curvature operators implemented is based on the 1, −2, 1 pattern as enumerated in Table 9.

TABLE 9

| Y1 | Y2 | Y3 | Y4 | Y5 | Y6 | Y7 |
|---|---|---|---|---|---|---|
| 1 | −2 | 1 | | | | |
| 1 | 0 | −2 | 0 | 1 | | |
| 1 | 0 | 0 | −2 | 0 | 0 | 1 |

A presently preferred embodiment of the wireless KVM system uses the first two operators only but applies them at every available offset for segments of up to length nine. The net effect is the following system of equivalent operators, shown in Table 10.

TABLE 10

| Y1 | Y2 | Y3 | Y4 | Y5 | Y6 | Y7 | Y8 | Y9 |
|---|---|---|---|---|---|---|---|---|
| 1 | −2 | 1 | | | | | | |
| | 1 | −2 | 1 | | | | | |
| | | 1 | −2 | 1 | | | | |
| | | | 1 | −2 | 1 | | | |
| | | | | 1 | −2 | 1 | | |

TABLE 10-continued

| Y1 | Y2 | Y3 | Y4 | Y5 | Y6 | Y7 | Y8 | Y9 |
|---|---|---|---|---|---|---|---|---|
| | | | | | 1 | −2 | 1 | |
| | | | | | | 1 | −2 | 1 |
| 1 | 0 | −2 | 0 | 1 | | | | |
| | 1 | 0 | −2 | 0 | 1 | | | |
| | | 1 | 0 | −2 | 0 | 1 | | |
| | | | 1 | 0 | −2 | 0 | 1 | |
| | | | | 1 | 0 | −2 | 0 | 1 |

The FPGA implementation operates in parallel by nature, so it measures curvature on both scales simultaneously for each arriving input pixel.

Figure 4:
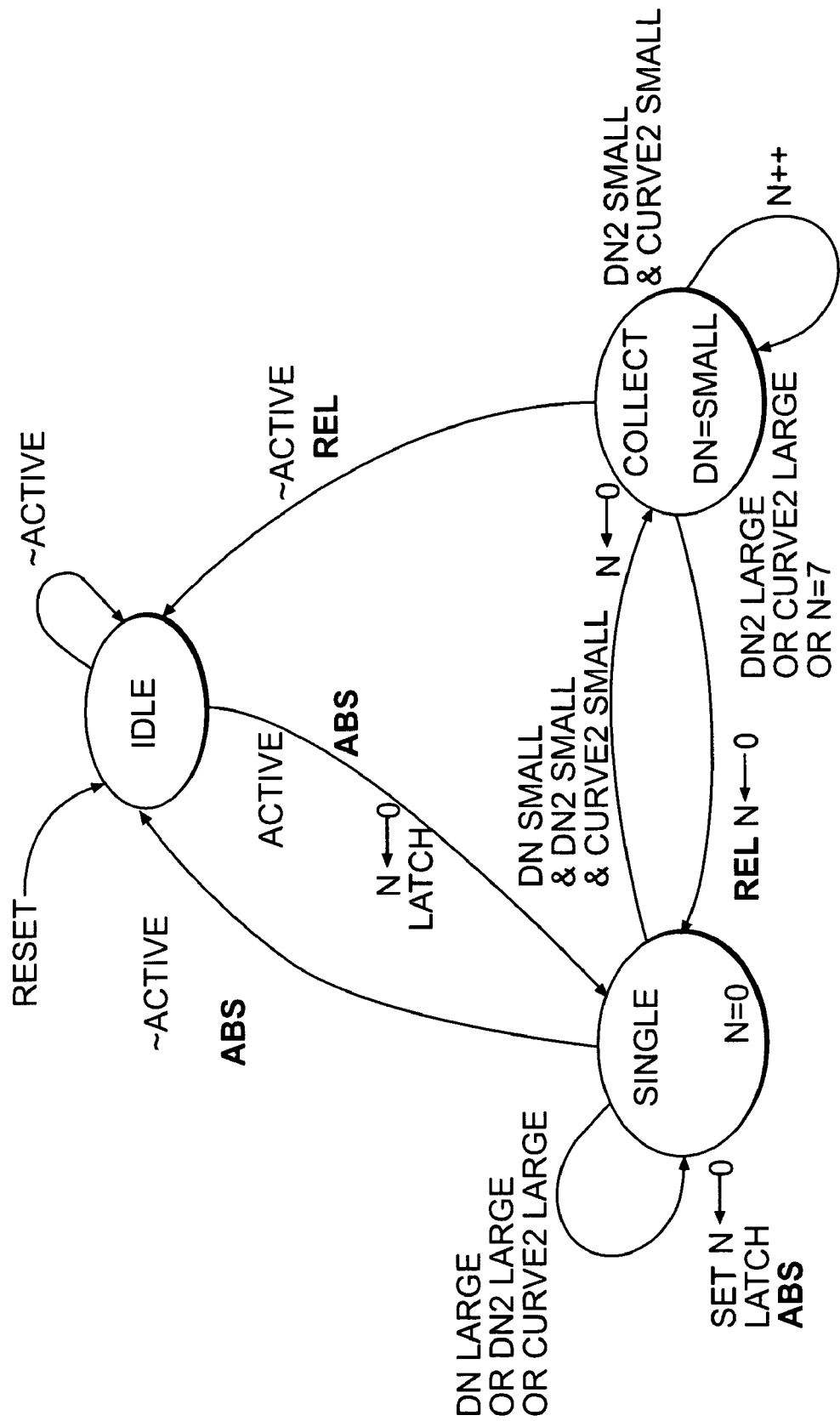
FIG. 4 is a state diagram of a compression algorithm creating 16-bit compressed codes according to embodiments of the present invention.

FIG. 4 summarizes the state machine of the algorithm and indicates in bold letters the times at which the algorithm latches compressed codes into the output buffer. As used in FIG. 4, a. 'active' is a signal that is true only across the pixels of a line to be coded, that is the active pixels.
b. ABS means to emit an absolute coded segment (e.g., per FIG. 2(*a*))
c. REL means to emit a relatively coded segment (e.g., per FIG. 2(*b*))
d. DN is the distance between the current pixel and the last one
e. DN2 is a look ahead of DN, meaning that it is the distance between the current pixel and the next one.
f. The expressions DN large and DN2 large become logically true when the difference between starting and ending relative segment values in any component field (R, G, or B) exceed the delta encoding limit imposed by the segment format of FIG. 2(*b*), that is, when the encoded difference exceeds the range −7 to 7. The expressions DN small and DN2 small are logical complements of DN large and DN2 large, respectively.
g. The expression curve2 large becomes logically true when the curvature threshold Δ is exceeded at any metric scale in any component field (R, G, or B). By analogy, curve2 small is the logical complement of curve2 large.

Figure 5:
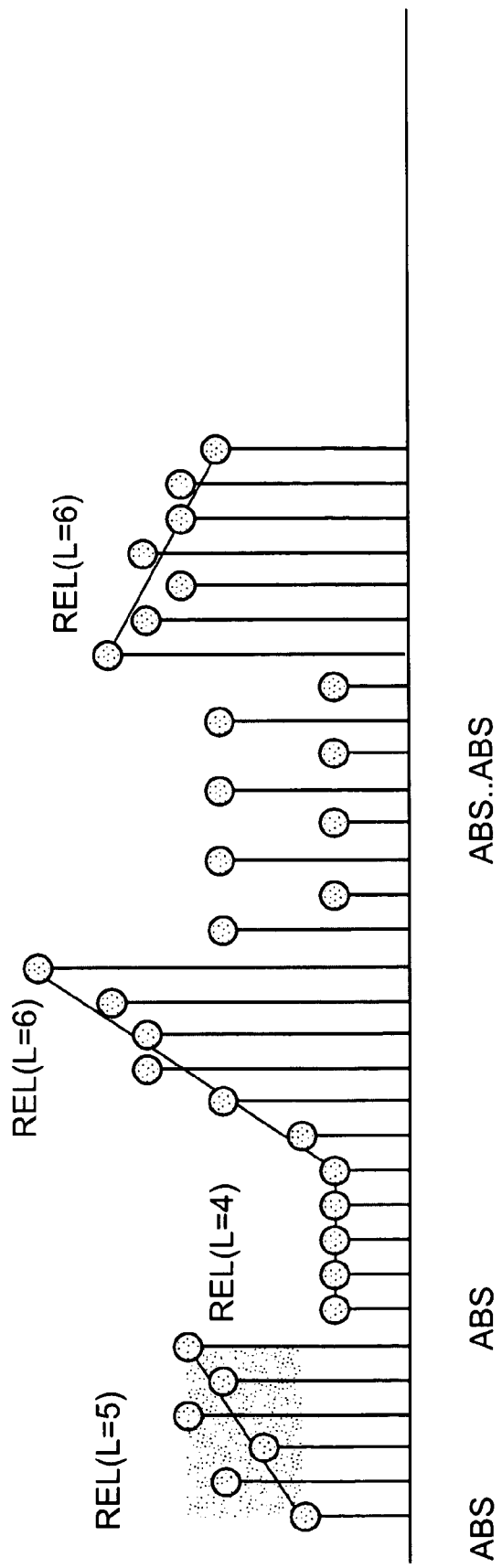
FIG. 5 shows an example sequence of a component of an 8-bit RGB stream.

The video stream consists of 8-bit R, G, and B values presented to the compressor. FIG. 5 shows an example sequence of one of the components of this stream, that is one of R, G, or B. In order for a segment to satisfy relative coding requirements, each of the component sequences must satisfy the constraints of delta range within 7 (using 6-bit resolution) and curvature less than fixed threshold Δ as described above.

Figure 6:
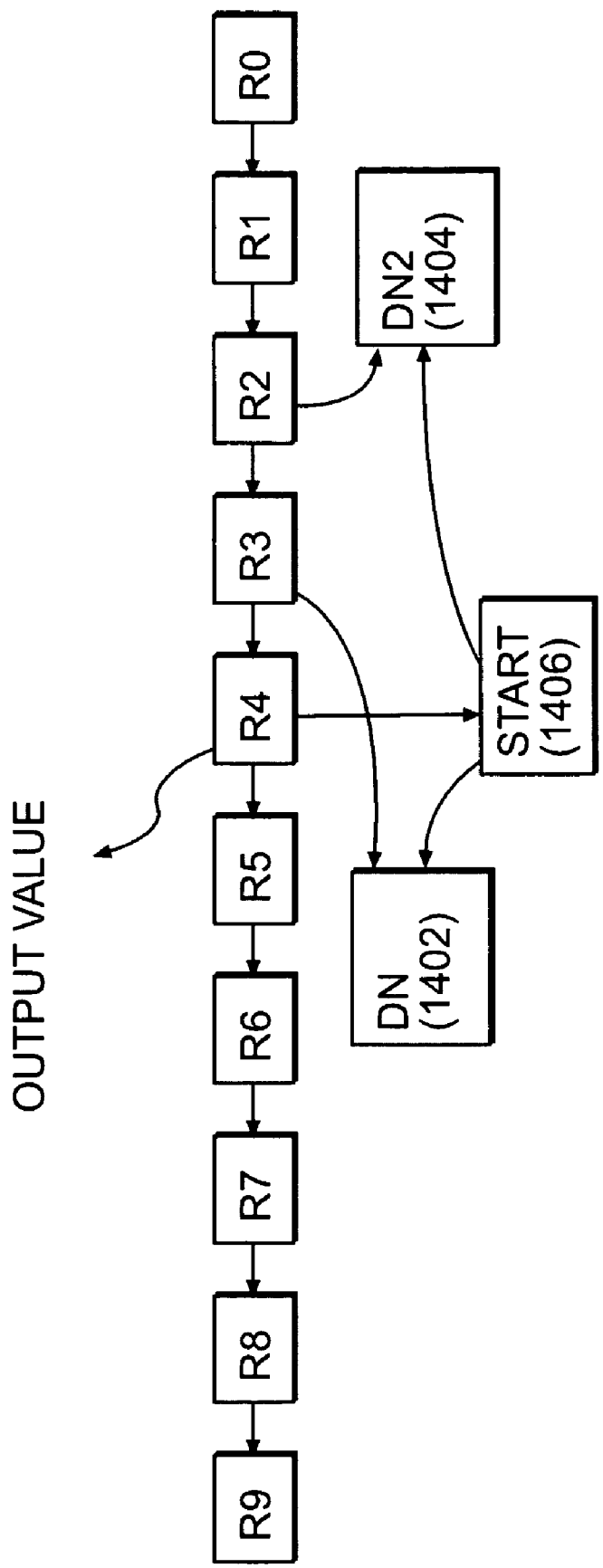
FIG. 6 shows an exemplary pipeline of red pixel values.

FIG. 6 shows an example of the pipeline of red pixel values, with identical pipelines processing green and blue components. The process depicted by FIG. 6 detects differences exceeding plus or minus 7 and curvature over threshold. For simplicity, the discussion from this point forward documents the red component, since the green and blue components are identical. The pipeline is used to determine the current value of deltaR next (DN) and a lookahead for deltaR next (DN2). By the time DN is accessed, one cycle after it is calculated, it represents the current difference between the start pixel and the present pixel. The structure used to determine the difference between the current R value and the next is now known. The "start" register is latched from R4 whenever an absolute code is processed or when a relative code segment is terminated. The DN difference tells us if the next pixel will exceed the delta limit of 7. DN2 is a lookahead needed due to pipelining constraints, which are required to meet the cycle timing. In addition DNB and DNB2 values perform the same calculation except using R4 instead. This is necessary because in the lookahead it is not yet known whether the latching from R4 to "start" occurs. If the difference is not calculated until after the latch, the propagation requires cannot be met. Precomputing both possibilities means that all values required to make the decision to continue the segment or terminate it are immediately available at the beginning of the cycle. This enables a one-cycle decision in the presently preferred embodiment.

In summary, the value DN indicates whether the next pixel will break the delta limit requirement, so that a relative code can be emitted now and a new segment started with the next pixel. This structure is replicated twice to cover the G and B values as well.

Figure 7:
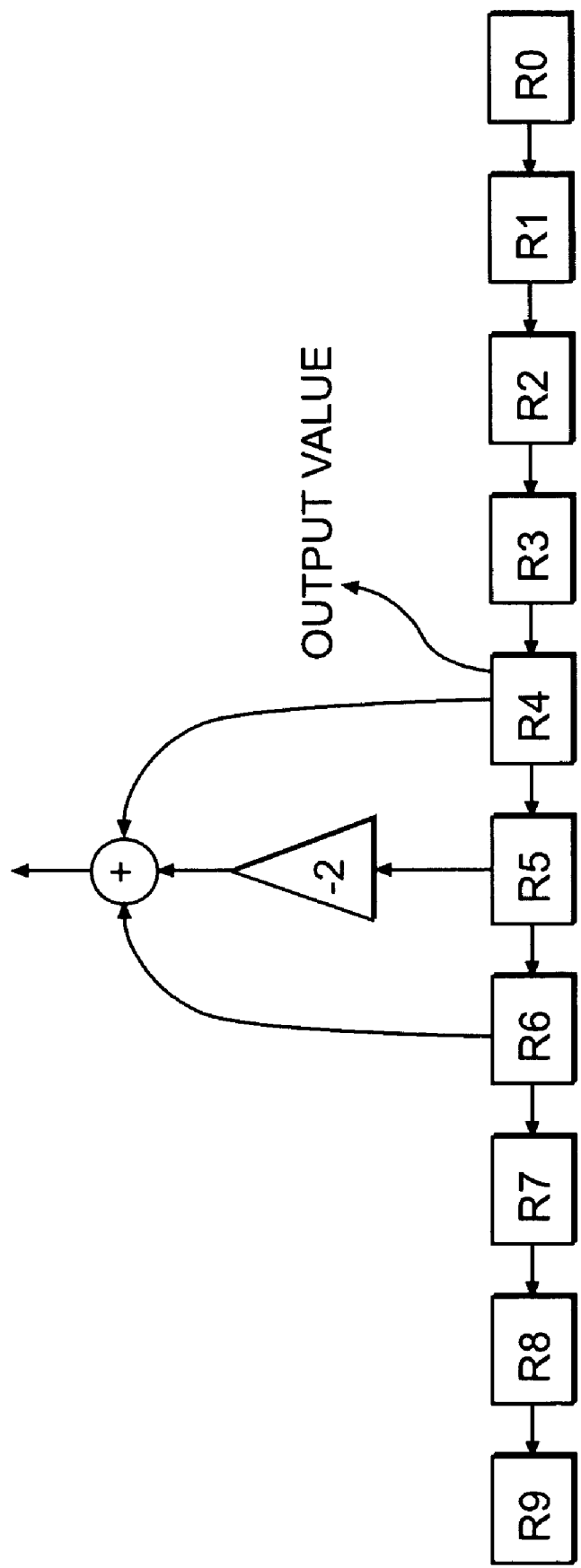
FIGS. 7-8 show how curvature of a line is measured using an FIR filter according to embodiments of the present invention.
Figure 8:
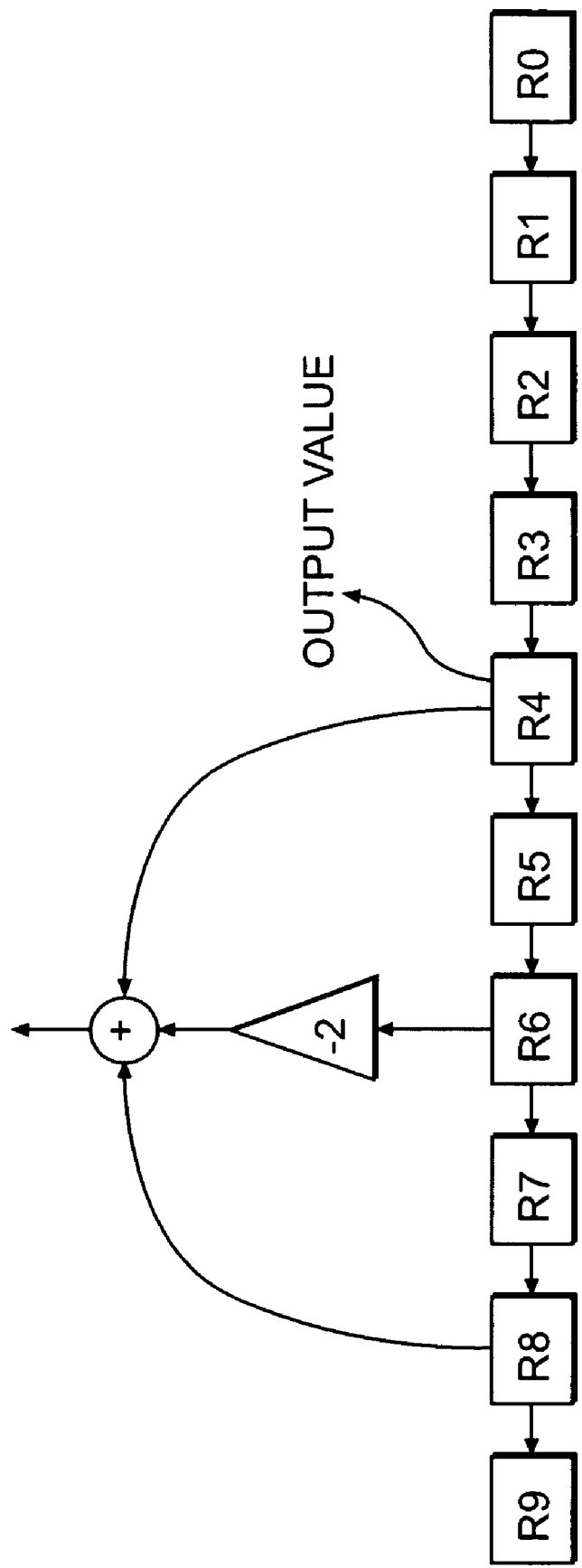

FIG. 7 shows how the curvature of the line is measured using a simple 1, −2, 1 FIR filter. The triangle depicts multiplication by −2, and the circle depicts addition of three input values. If the R value sequence describes a line, then the FIR filter produces zero output. This results from the fact that the sum of the coefficients is zero. Since R5 in the case of linear input is the average of its neighbors, specifically (R6+R4)/2, then doubling this value and subtracting from R6+R4 always produces zero output. The absolute value of the output is then a measure of curvature, since it corresponds to increasing deviation away from a straight line. This same FIR can be applied to R8, R6, and R4 to measure curvature over a larger scale (as in FIG. 8), and so on for yet larger scales. This then provides a measure of how well the line segment being dynamically built fits the data points it represents at any point in the process.

One of skill in the art would realize that the implementation using scale versions of the basic 1, −2, 1 curvature metric significantly reduces complexity and creates a linearity constraint symmetry not present in the original criteria. The implementation also applies curvature constraints along the range of scales. Specifically for the case of maximum length nine segments, three curvature scales apply: lengths three, five and seven. The length seven operator only applies for three shifts and only when there is a long segment. Investigation shows that inclusion of only length three and length five operators is effective in constraining curvature. The algorithm also expands linearly if the maximum segment length is increases.

Figure 9:
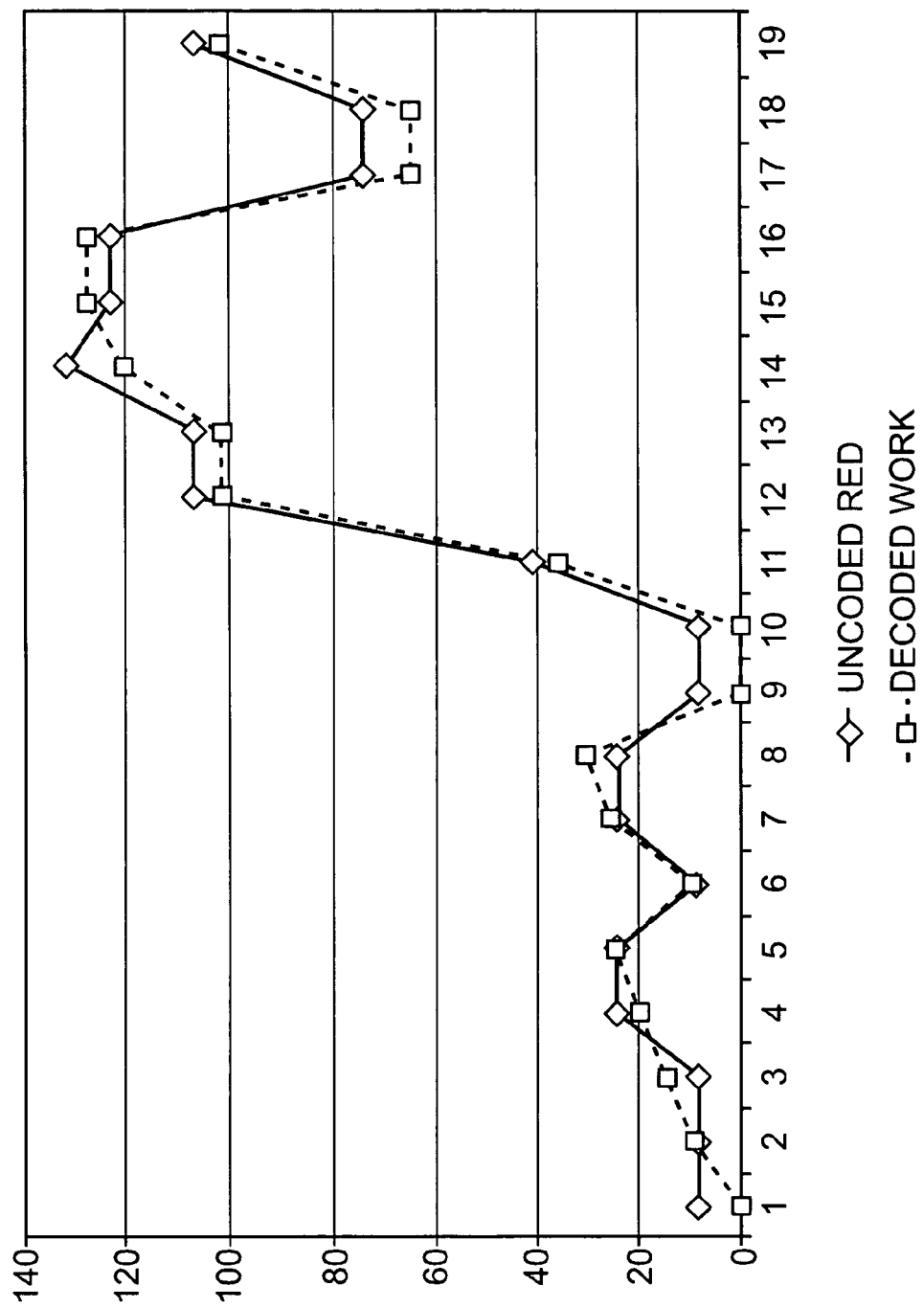
FIG. 9 depicts a comparison of input video samples with corresponding samples out of the decoder in the receiver after decompression.

FIG. 9 depicts the comparison of input video samples from the blue component with the corresponding blue samples out of the decoder in the receiver after decompression. The data used in the plot results from sending real picture data through compression/decompression simulation software.

As an example, the compression algorithm was applied to a typical desktop image and to a typical picture image. The following Table 11 shows the resulting number of segments of each length (1 through nine) for each of the images. Length 1 is absolute-coded. Lengths 2 through 9 are relative-coded.

TABLE 11

| Length | Desktop image No. Segments | Picture image |
|---|---|---|
| 1 | 53602 | 184538 |
| 2 | 5639 | 30967 |
| 3 | 5781 | 35299 |
| 4 | 3236 | 17377 |
| 5 | 2574 | 9531 |
| 6 | 1649 | 4689 |
| 7 | 1244 | 5694 |
| 8 | 1836 | 3860 |
| 9 | 71593 | 24140 |

Figure 10:
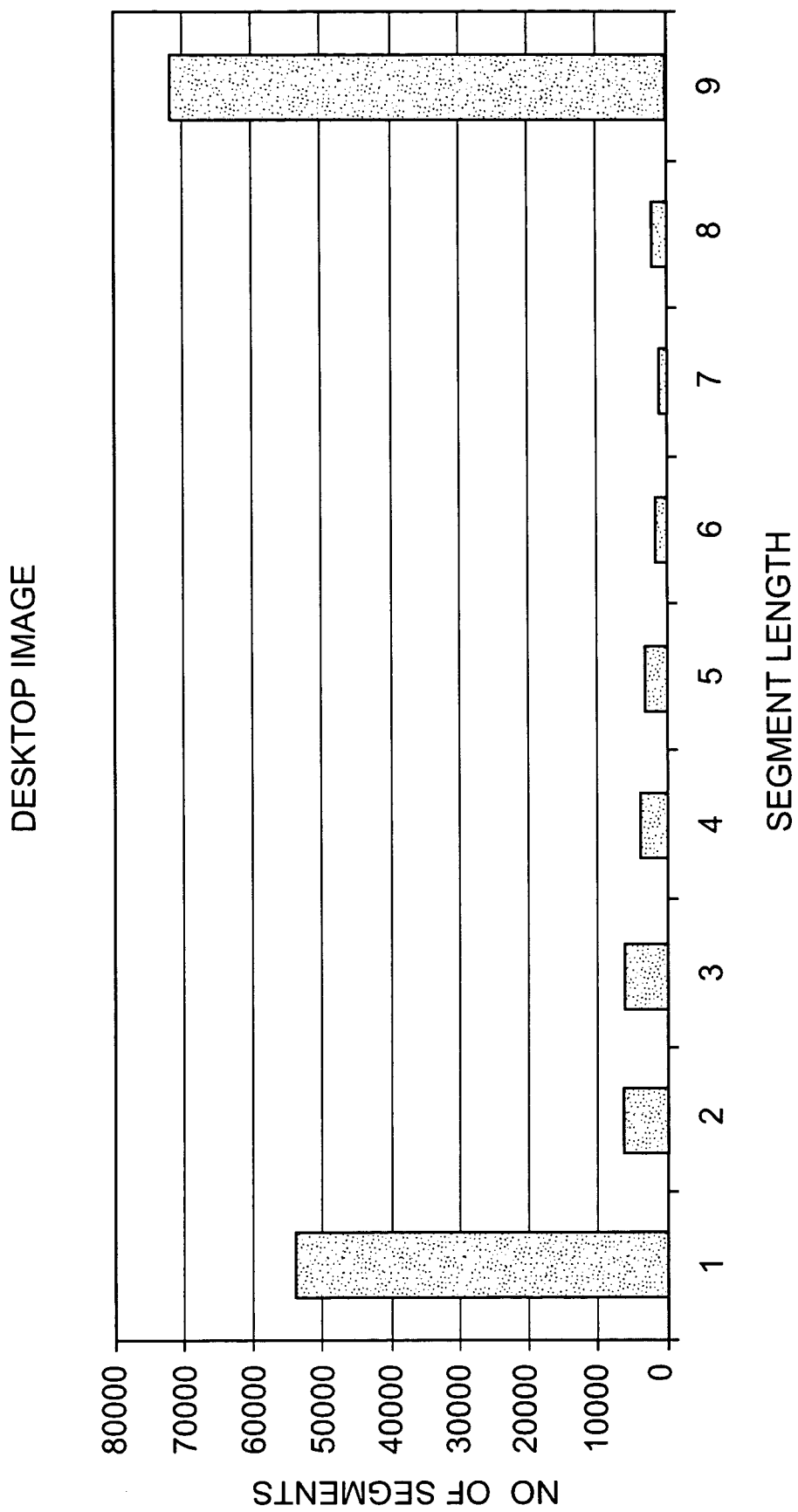
FIGS. 10(a) and 10(b) show results of runs of the image compression algorithm applied to a desktop image and to a picture image.
Figure 10B:
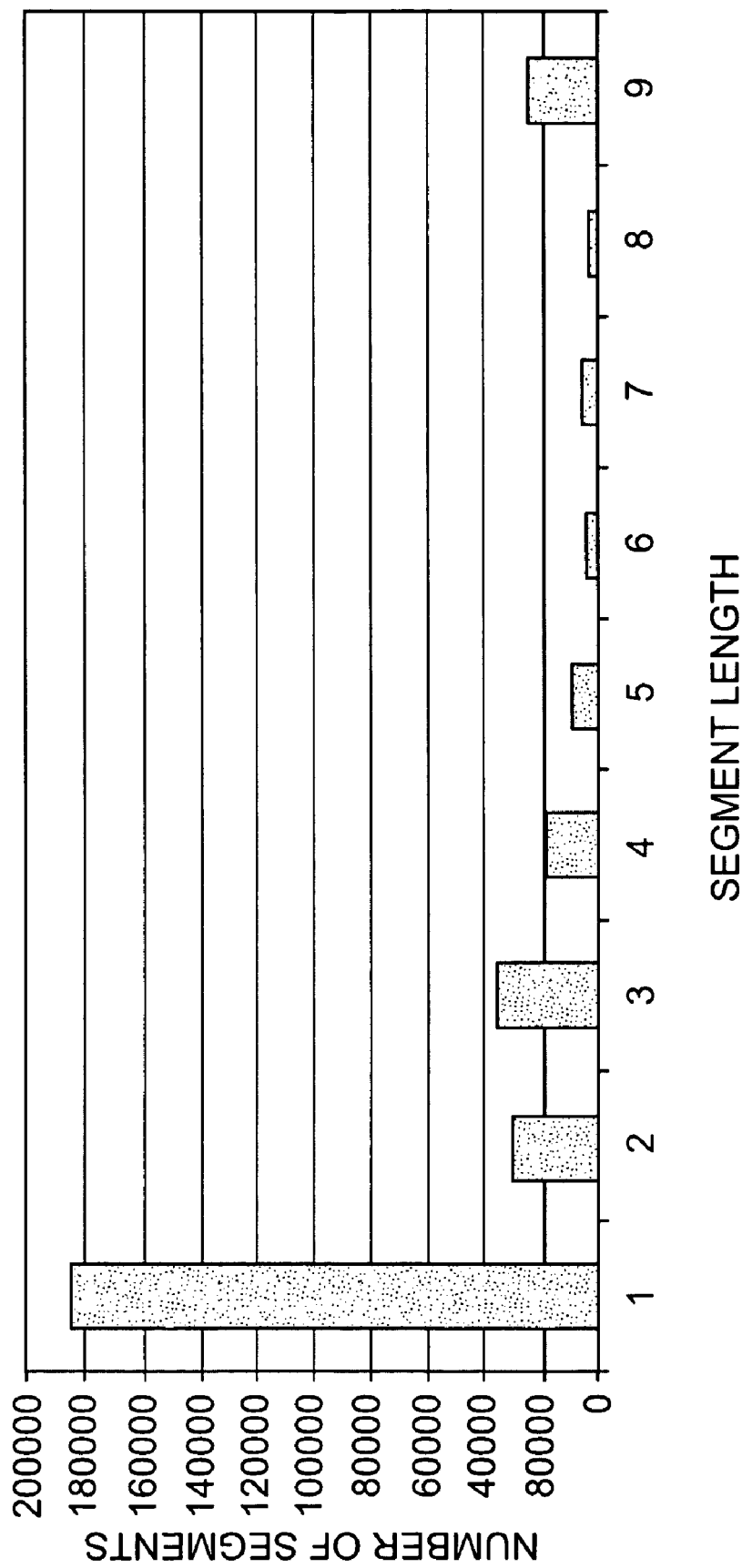

FIG. 10(a) is a histogram plot of the distribution of segment lengths for the desktop image, and FIG. 10(b) is the same information for a typical picture image.

The presence of a large number of maximum length segments-indicates that the compression ratio would improve if longer segments are allowed. This is the case for the desktop image with compression at approximately 8:1. The picture image has lower compression at about 3.7:1, but there are very few segments of length 5, 6, 7, 8, or 9. This indicates that increasing the segment length in the segment format would improve the desktop image but not help the picture image. Thus, increasing the segment length would not improve the compression ratio for images where the compression is low and most needs improvement.

Frame-To-Frame Compression

In another aspect of the present invention, a frame-to-frame compression strategy suppresses the sending of similar pixel values when the values have not significantly changed. In many cases, there is a section of video on the screen that is changing, but pixels above, below, to the left, and to the right of the section remain essentially the same. Using so-called margins approaches, only the pixel values that require updating are sent. Identifying the first and last pixels of each line that have changed more than a threshold amount allows us to send only the video material between the two margin points.

Left Margin Compression Algorithm

The left margin approach compares pixel values at the beginning of each line starting at the left of the line and working to the right. The algorithm locates the left margin at the first point where the pixels significantly differ, specifically by an amount greater than a programmable threshold. The algorithm preferably uses the so-called city-block distance metric computed as:

$$dist(p_1,p_2)=|p_1(\text{red})-p_2(\text{red})|+|p_1(\text{green})-p_2(\text{green})|+|p_1(\text{blue})-p_2(\text{blue})|,$$

representing the distance between pixels $p_1$ and $p_2$. In a 24-bit RGB representation, each of red, green, and blue range in value from 0 to 255. The presently preferred distance metric then produces measures from 0 up to 3*255=765. Meaningful thresholds values are in the range of 25 to 75. A low threshold value sends nearly all of the pixel values that have changed but results in a high bandwidth requirement of the wireless link. A high threshold value significantly reduces the bandwidth but allows visual artifacts to persist on the display where the video is changing but not enough to exceed the threshold value.

The video transport system affects compression by sending only the compressed video on each line from the left margin location to the end of the line.

Previous line information exists in the CPU in compressed form but does not exist in the FPGA. In order to compare pixels, prior frame segments must be sent back from the CPU to the FPGA and decompressed in the FPGA. The FPGA receives prior-frame compressed video from the CPU over a VO (Video Out) port and synchronously decompresses the video and compares it pixel-for-pixel to the incoming D/A samples. At the point that a pixel difference between frames exceeds the threshold, the comparison stops. If the decompressed stream at that time is presenting an absolute segment (one pixel), that pixel is discarded and the normal compression algorithm begins on the corresponding incoming pixel with a replacement absolute segment. The FPGA proceeds to the end of the line processing new input pixels into segments. The new data at the end of the line begins with an absolute segment and proceeds to the end of the line.

Often the decompressed stream is in the middle of a relative segment (line segment) when the pixel difference exceeds the threshold. In this case the segment is discarded, and the system looks back in a small input pixel buffer (large enough to hold at least the last nine pixels) to the first pixel represented by the line segment breaking the threshold. The FPGA then backs up to this prior pixel and starts feeding input pixel values sequentially from that point forward into the compressor. This first pixel into the compressor creates an absolute segment just as if it were at the beginning of a line. As in the case where the left margin falls on an absolute segment, compression of input pixels proceeds from this point to the end of the current line.

Figure 11:
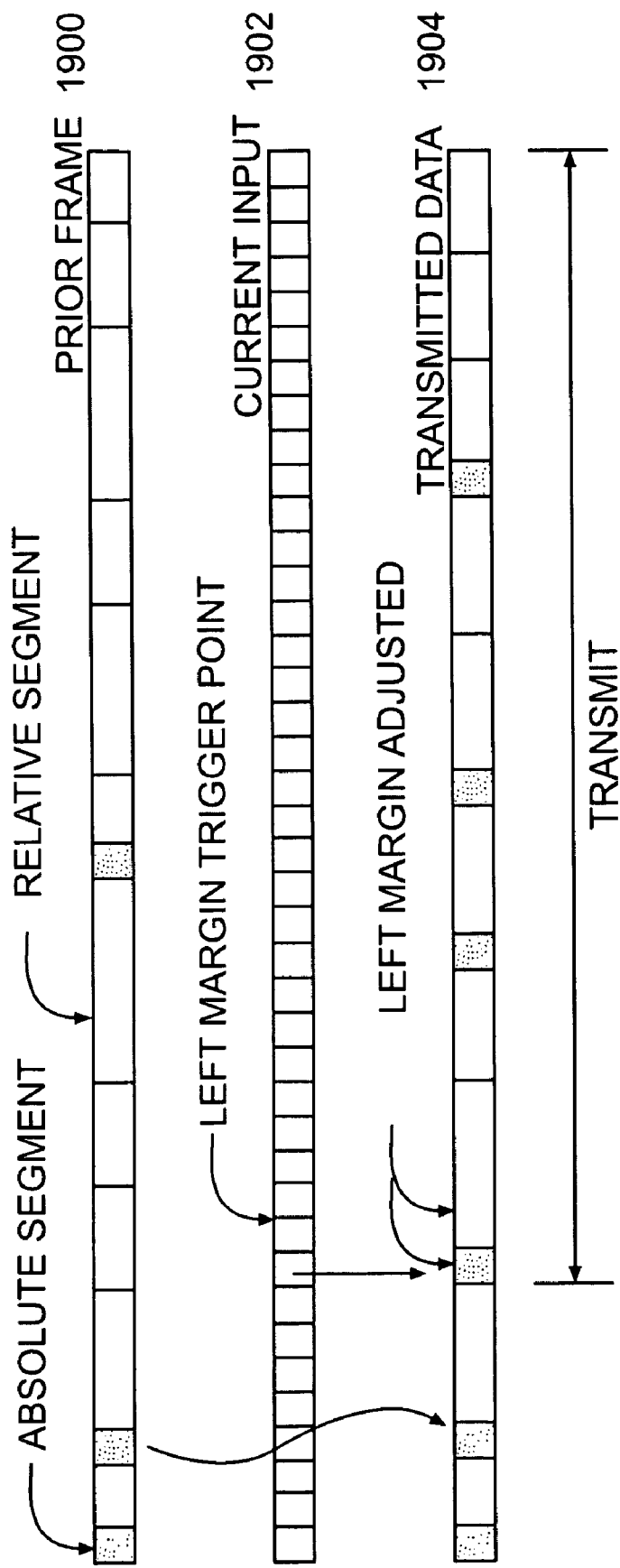
FIG. 11 depicts aspects of the Left Margin compression algorithm.

FIG. 11 depicts aspects of the operation of the left margin compression algorithm. In FIG. 11, the prior frame bar 1900 represents the sequence of segments produced by the prior frame for a particular line in the video frame. The second bar, current input 1902 represents the pixel values presented for the present frame, which are very similar up to the detected left margin point. Since there is a relative segment in progress at the left margin point, the system backs up to the beginning of that segment and begins substituting newly compressed pixel values from that point to the end of the line. Only the new information in transmitted data bar is transmitted to the receiver unit. The FPGA outputs the complete line and reports the left margin point back to the CPU. The CPU holds the entire line since it must send it back to the FPGA in the next frame.

The above algorithm constrains the left margin to begin on an existing segment boundary. This dramatically simplifies the process of matching the boundary in the prior frame segment list. Without this constraint, segments would have to be modified if the left margin falls in the middle of a segment. This modification would require an extra time-consuming operation in interrupt code that needs to execute very efficiently, so it would likely need to happen in the FPGA. The segment modification would also have to happen identically in the transmitter and receiver. There is no channel bandwidth advantage to sending only the pixels that changed. The same number of segments will still need to be sent. Rather than splitting segments to reduce the number of pixels affected, it is more efficient to just send updates of the affected segments. Segments that remain the same will not be transmitted.

Figure 12:
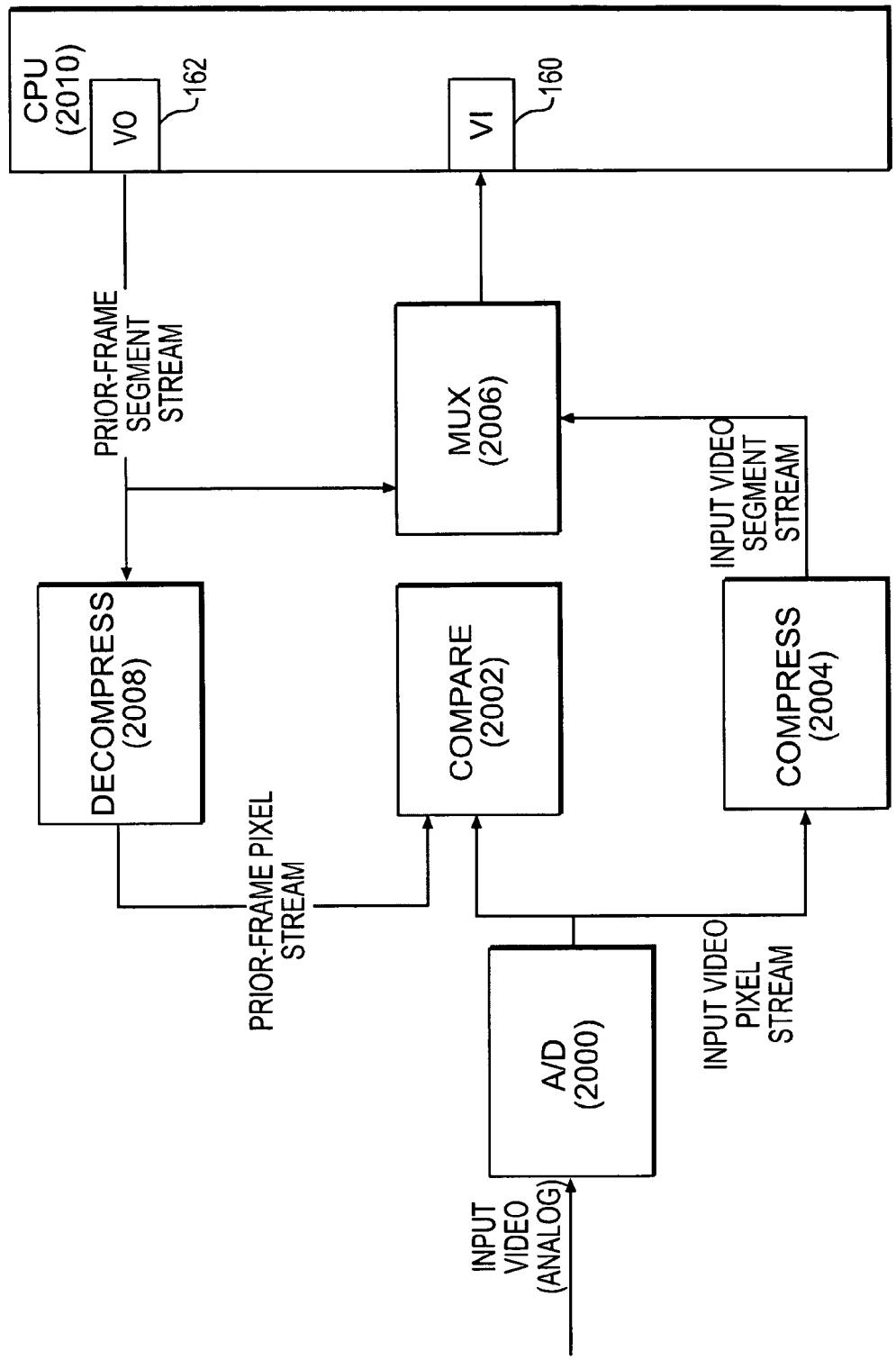
FIGS. 12-13 are diagrams of the transmitter and receiver sides, respectively, of a KVM system using Left Margin compression.

FIG. 12 is a diagram of the transmitter side 116 of a KVM system using Left Margin compression. As shown in the figure, analog video is input to analog to digital converter (A/D) 2000 (Triple A/D 152 in FIG. 1(c)). After the video is digitized it is sent for both comparison, 2002, and compression, 2004. The input video is compared to video from a prior frame. The prior-frame video enters the system through the VO port on CPU 2010 (TM1300 Processor 146 in FIGS. 1(b) and 1(c)) and is then decompressed, 2008, before being compared to the current-frame video data. After the comparison of the two signals and the compression of the current-frame input signal, multiplexer (MUX) 2006 outputs the appropriate video data. The output of multiplexer 2006 can be, for example, the same data as the previous frame, an entirely new set of frame data, or a set of data between those two sets. This data is sent to the VI port 160 of CPU 2010 (TM1300 Processor 146 in FIGS. 1(b) and 1(c)) for transmission to the receiver-side 126 of the system.

Figure 13:
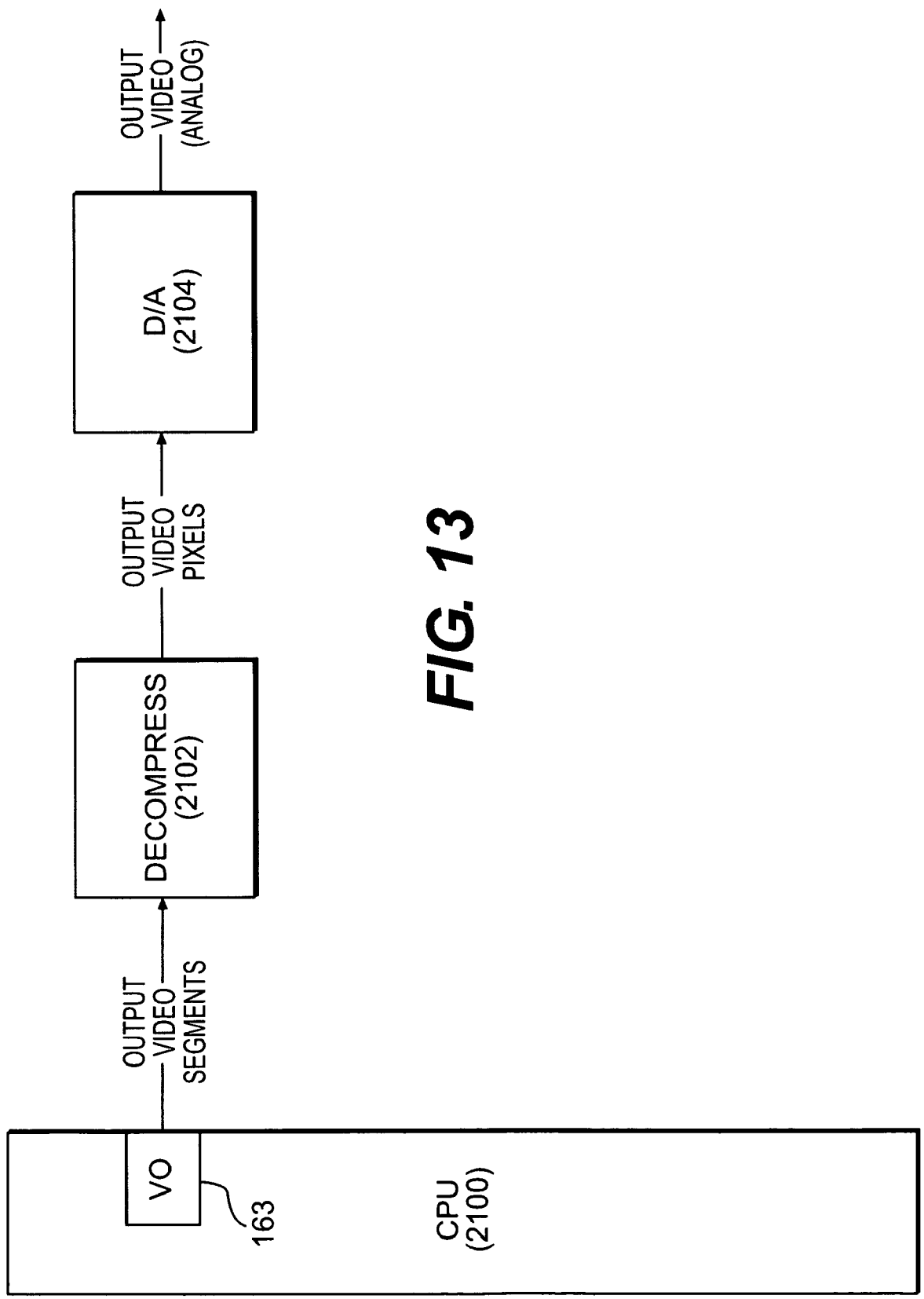

FIG. 13 is a diagram of the receiver side of a KVM system using Left Margin compression. Output video segments received by CPU 2100 (147 in FIGS. 1(b) and 1(c)) are sent out VO port 163 for decompression, 2102. The output video pixels from the decompressor are then converted to output analog video by D/A 2104 (147 in FIGS. 1(b) and 1(c)), which can then be displayed.

In the above described feedback system with a channel carrying partial information, the version of segments in the receiver must always exactly match the prior-frame segments in the transmitter. The switch from prior frame segments to current frame segments must match in the transmitter and receiver. A mismatch will lead to corrupted video in the receiver. Thus the prior frame segments from the CPU to the FPGA in the transmitter must match the segments in the receiver. To satisfy this requirement, the segment stream out of the FPGA represents the entire line as it will be once the changed segments are transmitted to the receiver and replace the prior frame segments. The FPGA sets a left margin marker indicating the first segment that is different. Thus the CPU holds the entire line but only transmits the differing segments to the receiver. The completed line waits in the CPU for the next frame to provide prior-frame information to the FPGA. This path through the CPU and back is necessary because the FPGA does not have enough memory to store an entire video frame.

Figure 14:
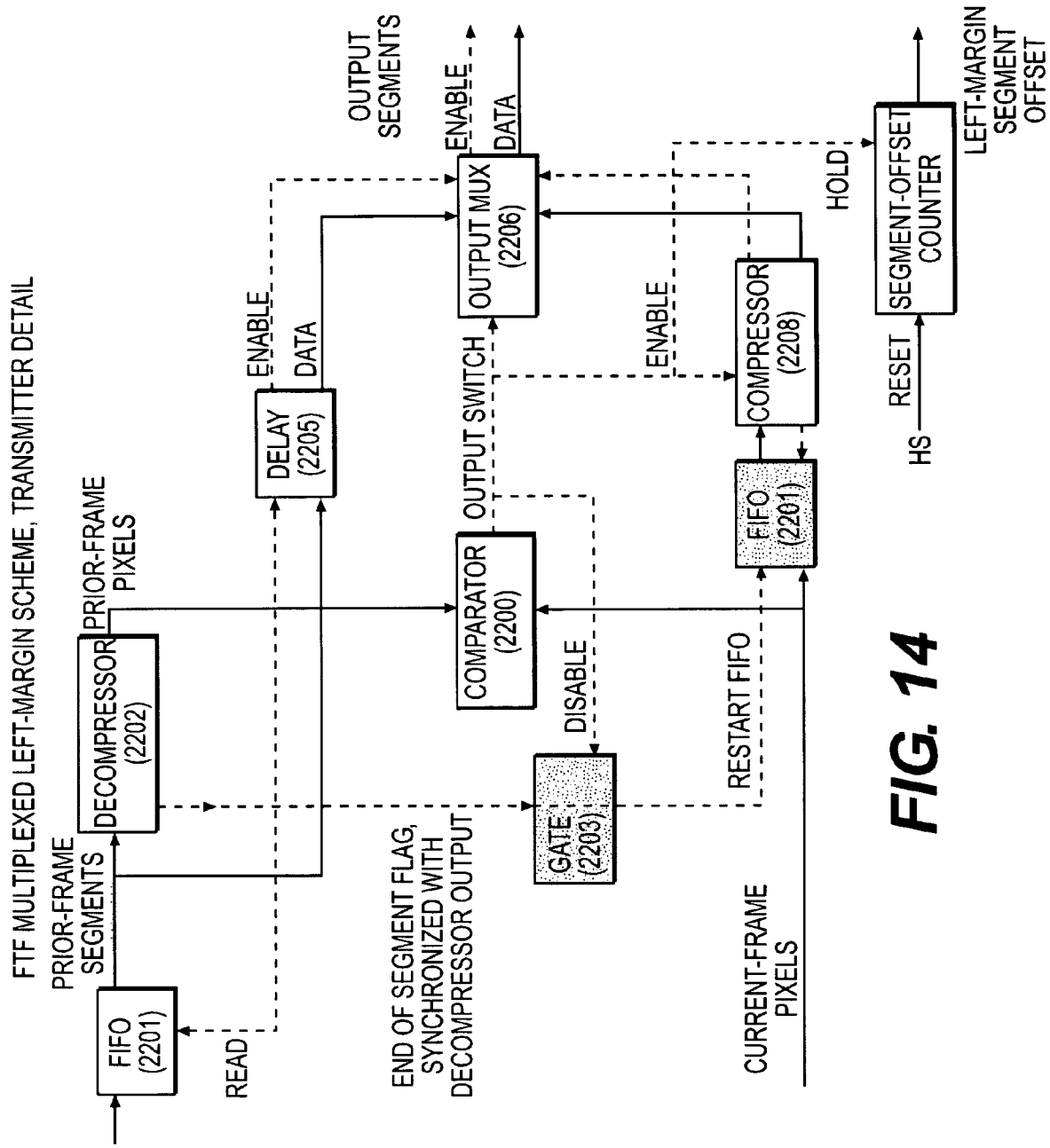
FIG. 14 depicts the Frame-to-frame (FTF) Left Margin Scheme.

In the Frame-to-frame (FTF) Left Margin Scheme shown in FIG. 14, the comparator 2200 issues an output switch command upon the first instance in the line of a pixel-difference over the FTF threshold. When activated, this comparator output line latches for the remainder of the line and is reset by horizontal sync. The decompressor 2202, which receives as input prior-frame segments from FIFO 2201, provides an additional end-of-segment logical output line synchronized with the output pixel stream. This line is asserted when the current output pixel represents the last pixel in a relative segment, which includes absolute segments. Prior to the activation of the output switch line, this signal flows through a gate 2203 to a FIFO 2204 holding input pixels to be potentially applied to the compressor 2208, but prior to the switch the compressor 2208 is held idle. At output switch time, the output multiplexer 2206, which also accepts inputs from delay gate 2205, selects the output of the compressor 2208, and the output switch enables the compressor 2208 and disables the restart line. This effectively accomplishes a backup to replace the segment causing the over-threshold pixel difference. Activating the restart FIFO line loads the next value as the only FIFO entry. This action breaks down into two sub-actions, clear the FIFO and latch a value, except in our case it happens in one cycle. The Segment-Offset Counter is set to zero at the beginning of a new line. It counts up until the output-switch line is activate, at which time it stops counting. The value of the Segment-Offset Counter at the end of processing the line is the Left Margin segment offset value for the current line.

Thus the Left-Margin strategy accomplishes frame-to-frame compression by suppressing information at the beginning of each line that has not changed more than a programmable threshold.

Right Margin Compression Algorithm

In another aspect of the invention, a so-called Right Margin strategy suppresses the transmission of segments at the end of each line when the pixels from the previous frame are highly similar to those in the present frame, specifically they are within the programmable threshold.

Figure 15:
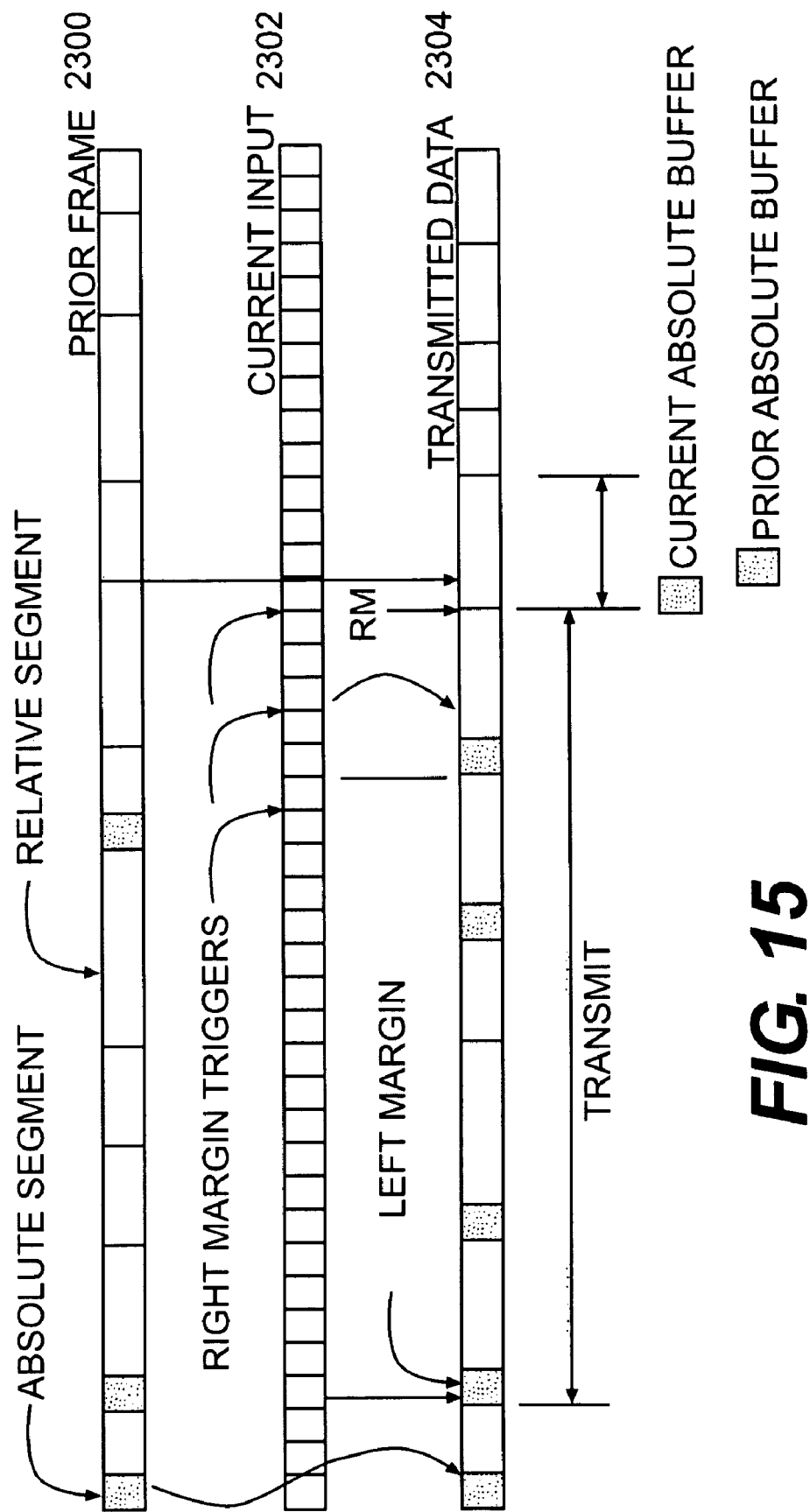
FIG. 15 depicts aspects of the Right Margin compression algorithm.

FIG. 15 depicts aspects of the Right Margin compression algorithm according to embodiments of the present invention. As shown in the example of FIG. 15, there are multiple Right Margin trigger points and two absolute segment buffers have been added. Information arrives sequentially in our system, so processing this information causally is impossible in the Right Margin case since the Right Margin is not known until all input pixels have been compared with prior frame data 2300. The last Right Margin trigger (RM) survives as the one true Right Margin point. Once the end of the line is reached, the last Right Margin trigger point is confirmed as the true Right Margin. Only the pixels between the true Right Margin point and the end of the line pass the similarity test and do not need to be among transmitted with transmitted data 2304.

The algorithm detects a string of consecutive similar pixels and marks a candidate Right Margin point as well as segment and pixel counts required for the remerging process. The algorithm records the segment offset and pixel counts for the current frame 2302 and for the prior frame 2300 segment streams. The FPGA continues to output newly compressed pixels after the Left Margin point as before. If pixel values between the decompressed prior frame data and the newly received pixels differ, then the Right Margin point is shifted to the right and segment and pixel counts updated. If pixel values are similar, the Right Margin marker is not moved. At the end of the line, the Right Margin marker is the true Right Margin value and the segment and pixel counts are valid.

In the Right Margin case, and unlike the Left Margin case, the algorithm needs to transition back into the original data. This is complicated by the fact that the data is processed causally left-to-right and the Right Margin point will not be confirmed until the last input pixel is processed. It may appear that the end-of-line pixel values are similar, but one different pixel at the end of the line moves the Right Margin point to the last position.

Right Margin merging is more challenging due to the presence of relative segments. The algorithm must create the appropriate relative segment at the Right Margin point to properly fit back into the original segment stream. One skilled in the art will realize that one simple strategy to deal with this issue is to converting all pixels back to absolute segments during the transition. This may require backing up to some preceding absolute and working forward through the relative segments to determine the current absolute pixel value. The only guaranteed prior absolute is at the beginning of the line, thus this might mean backing up to the first segment. To prevent this time consuming process, the absolute RGB pixel value at the beginning of the relative segment occurring at the Right Margin point is registered. This facilitates converting a relative segment to an absolute.

Figure 16:
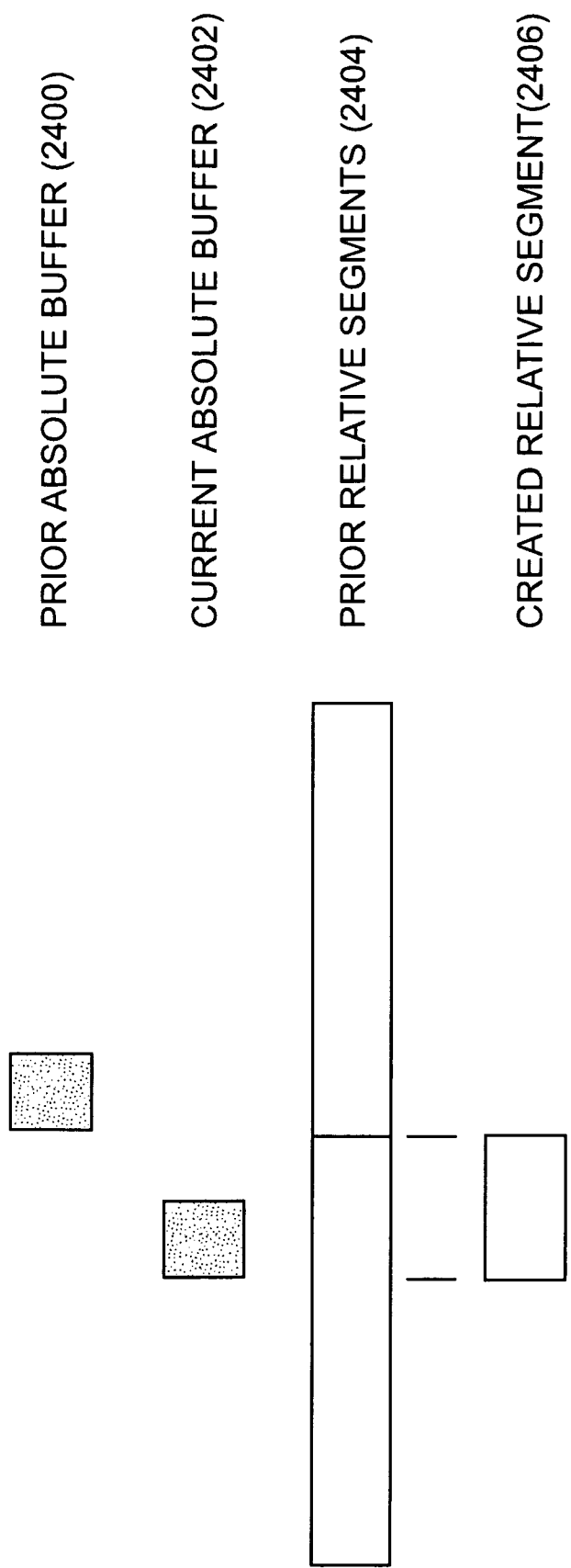
FIG. 16 depicts the correct relative segment to match back into the original stream.

Alternatively, the correct relative segment to match back into the original stream could be computed, as shown in FIG. 16. This approach results in fewer segment transmitted so is more desirable. At the transition point the data needs to remerge into the prior frame stream. This is done with the help of the contents of the absolute buffers. Also the RM pointer is moved to the right to line up with the next segment boundary in the prior frame data. At this point only the first segment in the prior-frame segment stream needs to be modified as it is remerged. If the first segment in the prior-frame stream is absolute (2400), then the merging is automatic. No modification is necessary in this case. If the first segment is relative (2404), we need to modify the relative segment to new delta RGB values. The pixel value in the absolute buffer prevents from having to look back many segments and mathematically accumulate the relative segments to determine the current absolute value (2402). The absolute value of the prior frame pixel is efficiently available from the prior-frame decoder output.

The algorithm uses the Right Margin offset, segment and pixel counts, and the absolute buffer values from the FPGA to facilitate the transition fix-up. Specifically, if a relative segment is in process at the Right Margin, it waits until the end of the segment to transition and substitutes an absolute code there or calculates a relative segment. It then begins copying prior frame segments into the output stream.

Single-Line Refresh

When frame-to-frame compression is activated at the time a connection is made, it is necessary in the first frame to send entire lines to provide a starting point for frame-to-frame compression to work properly. Also when packets are lost, the remote station will flag the corresponding affected lines as no-paste, indicating that subsequent video sent to those flagged lines will be ignored until a line beginning with pixel 0 at the left edge is received. When frame-to-frame compression is working well, the local unit sends only the segments representing the portion of the image that has changed from the last frame more than a fixed threshold. This frame-to-frame partial sending process must be suspended at the start of a connection or after lost packets to cause the previous-frame representation in both the local and remote to perfectly agree. Only then will the frame-to-frame process start or restart synchronously. Any previous-frame discrepancy between local and remote will results in image errors. Thus under frame-to-frame compression, image transport has memory and is potentially fragile.

Frame-to-frame compression works when the local and remote versions of a particular line in the frame are identical. The situation arises that frame-to-frame compressed lines are corrupted due to lost packets and not restarted due to the fact that no uncompressed line is sent for a significant amount of time since the image at the local is not changing. The suspension of frame-to-frame compression on a given line is lifted as soon as a line is received in its entirety, starting with the first segment, absolute pixel zero.

In order to address the issue of lost synchronization between local and remote prior-frame data, the local continually sends a few lines of every frame in uncompressed form to guarantee local and remote video data synchronization, restoring synchronization for those lines where the synchronization has been lost. In preferred embodiments the local sends 12 consecutive lines starting with lines 0-11 uncompressed in the first frame. In the next frame it sends lines 12-23 uncompressed, and so on until the entire frame has been refreshed in a period of about two seconds. This process then repeats indefinitely for the duration of the connection. If there is ever a failure in the synchronization of local and remote, this washing refresh process is guaranteed to eliminate the problem in typically less than two seconds. Refresh may take longer if compression is low and frame transport requires more time.

The frame-to-frame compression operation in the local unit depends on the previous frame data being fed back into the FPGA synchronously on the VO port. The FPGA dynamically decompresses the stream of segments representing the same line from the previous frame. If pixel values arriving from the video A/D agree closely with the pixel values arriving from the decompressed previous-frame line data, the FPGA copies the previous segment values to the output. If the pixel agreement fails by exceeding a threshold, the FPGA finishes the remainder of the current line by encoding new pixels into segments beginning at the point where the comparison failed. The FPGA sends the segment offset representing new video information to the host TM1300. Thus the TM1300 accomplishes frame-to-frame video compression in the frame transport mechanism by sending only the segment offset and the stream of segments starting at the indicated segment offset and proceeding to the end of the line.

In some embodiments of the system, the FPGA may not have enough memory to store an entire frame of video. As a result the FPGA has no mechanism for storing information about what lines need to be sent in their entirety to restore frame-to-frame operation in the remote. The TM1300 host must override the frame-to-frame starting segment offset in the transport mechanism in order to send entire lines. Our straightforward solution is to create an array of bits that indicate which lines need to be refreshed. Bits in this array will be set by a process that marks blocks of consecutive lines in successive frames for a safety refresh. During the frame sending operation, a bit value of 1 will cause the entire line to be sent and not just the part of the line that changed.

As an alternative, in some embodiments, the system avoids allocating memory for the array of bits and directly alters the information in the video out ("VO") memory buffer. At the time that a decision is made to refresh a line, the system modifies the first segment of the line in VO memory in such a way as to cause the frame-to-frame comparison in the FPGA to fail with a very high probability. This indirectly causes the line to be sent in its entirety without any modification to the frame sending procedure and saves the memory necessary to indicate which lines need to be refreshed.

Noting that every line must begin with an absolute segment, the code there will be of the form:

```
0RRRRRBB BBBGGGGG
01000010 00010000
``` where the first bit is a 0 indicating that it is an absolute segment coding a single starting pixel. We modify this code by adding the value 0x4210 shown directly below the absolute segment format. The values from the B and G fields can carry over into the R and B fields, but this only affects least significant bits. The R field can carry over into the 0 bit, which is a problem since this converts the absolute segment into a relative segment with a different format. The system handles this issue by applying a mask of 0x7fff to force the top bit to 0. The current operation is $S'=(S+0x4210)\&0x7fff$ where S' is the new segment coding.

As an alternative, the system can exclusive-or the absolute segment as in $S'=S^\wedge 0x4210.$ It is possible for a given line that the first segment coded by the FPGA on the next frame matches the new segment coding value within the frame-to-frame threshold, however this situation should be extremely rare.

Thus are described various novel compression algorithms for use, e.g., in a wireless KVM system.

Generally, as contemplated by the inventors, and as one skilled in the art would recognize, a target computer may be any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, or a manufacturing or processing production line. A collection of target computers may, e.g., be a collection of servers in a rack or some other collection. They may be independent of each other or connected to each other in a network or by some other structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. In a wireless keyboard-video-mouse ("KVM") system in which a remote computer accesses the video output data of a target computer, a method of providing video data from the target computer to the remote computer, the method comprising:

compressing in a video compressor at least some of the video data using a line fitting compression scheme to produce at least one sequence of absolute coded pixel segments and relative coded pixel segments which combine to represent the video data; and providing the sequence of absolute coded pixel segments and relative coded pixel segments to the remote computer, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0, 1), then (1, 0, 0, −2, 0, 0, 1), and so on up to a maximum segment length.

2. A method as in claim 1, wherein each absolute coded pixel segment represents a single pixel and encodes the most significant bits of each color component of that pixel.

3. A method as in claim 2 wherein the most significant bits of each color component of a pixel comprise the top five bits of each color component of that pixel.

4. A method as in claim 1, wherein each relative coded pixel segment represents a sequence of pixels and defines a difference in value between a starting point of the first pixel in the sequence and an ending point of the last pixel in the sequence.

5. A method as in claim 4 wherein the sequence of pixels is between two and nine pixels in length and wherein the relative coded pixel segment provides a signed delta value of the difference between the starting point and the ending point of the segment.

6. In a wireless keyboard-video-mouse ("KVM") system in which a remote computer accesses the video output data of a target computer, a method of providing video data from the target computer to the remote computer, the method comprising:

compressing in a video compressor at least some of the video data using a line fitting compression scheme to produce at least one sequence of absolute coded pixel segments and relative coded pixel segments which combine to represent the video data, wherein each absolute coded pixel segment represents a single pixel and encodes the five most significant bits of each color component of that pixel and wherein each relative coded pixel segment represents a sequence of pixels and defines a difference in value between a starting point of the first pixel in the sequence and an ending point of the last pixel in the sequence, wherein the sequence of pixels is between two and nine pixels in length and wherein the relative coded pixel segment provides a signed delta value of the difference between the starting point and the ending point of the segment; and providing the sequence of absolute coded pixel segments and relative coded pixel segments to the remote computer, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0, 1), then (1, 0, 0, −2, 0, 0, 1), and so on up to a maximum segment length.

7. In a wireless keyboard-video-mouse ("KVM") system in which a remote computer accesses the video output data of a target computer, a device for providing video data from the target computer to the remote computer, the device comprising:

a compressing mechanism constructed and adapted to compress at least some of the video data using a line fitting compression scheme to produce at least one sequence of absolute coded pixel segments and relative coded pixel segments which combine to represent the video data; and a mechanism constructed and adapted to provide the sequence of absolute coded pixel segments and relative coded pixel segments to the remote computer, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0,1), then (1, 0, 0, −2, 0, 0, 1), and so on up to a maximum segment length.

8. A device as in claim 7, wherein each absolute coded pixel segment represents a single pixel and encodes the most significant bits of each color component of that pixel.

9. A device as in claim 8 wherein the most significant bits of each color component of a pixel comprise the top five bits of each color component of that pixel.

10. A device as in claim 9, wherein each relative coded pixel segment represents a sequence of pixels and defines a difference in value between a starting point of the first pixel in the sequence and an ending point of the last pixel in the sequence.

11. A device as in claim 9 wherein the sequence of pixels is between two and nine pixels in length and wherein the relative coded pixel segment provides a signed delta value of the difference between the starting point and the ending point of the segment.

12. In a wireless keyboard-video-mouse ("KVM") system in which a remote computer accesses the video output data of a target computer, a device for providing video data from the target computer to the remote computer, the device comprising:

a mechanism constructed and adapted to compress at least some of the video data using a line fitting compression scheme to produce at least one sequence of absolute coded pixel segments and relative coded pixel segments which combine to represent the video data, wherein each absolute coded pixel segment represents a single pixel and encodes the five most significant bits of each color component of that pixel and wherein each relative coded pixel segment represents a sequence of pixels and defines a difference in value between a starting point of the first pixel in the sequence and an ending point of the last pixel in the sequence, wherein the sequence of pixels is between two and nine pixels in length and wherein the relative coded pixel segment provides a signed delta value of the difference between the starting point and the ending point of the segment; and a mechanism constructed and adapted to provide the sequence of absolute coded pixel segments and relative coded pixel segments to the remote computer, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0, 1), then (1, 0, 0, −2, 0, 0,1), and so on up to a maximum segment length.

13. In a wireless keyboard-video-mouse ("KVM") system in which a remote computer accesses the video output data of a target computer, a method of providing video data from the target computer to the remote computer, wherein the video data represents sequences of video frames, each frame comprising a sequence of video lines, the method comprising:

compressing in a video compressor at least some of the video data using a line fitting compression scheme to produce at least one sequence of absolute coded pixel segments and relative coded pixel segments which combine to represent the video data;

providing the sequence of absolute coded pixel segments and relative coded pixel segments to the remote computer; and sending only a part of each video line from a left margin point to the end of the line, where the left margin point is defined as the left-most pixel of the video line to differ from the corresponding pixel in the corresponding line and in the prior frame by more than a programmable threshold amount, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0, 1), then (1, 0, 0, −2, 0, 0, 1), and so on up to a maximum segment length.

14. In a wireless keyboard-video-mouse ("KVM") system in which a remote computer accesses the video output data of a target computer, a method of providing video data from the target computer to the remote computer, wherein the video data represents sequences of video frames, each frame comprising a sequence of video lines, the method comprising:

compressing in a video compressor at least some of the video data using a line fitting compression scheme to produce at least one sequence of absolute coded pixel segments and relative coded pixel segments which combine to represent the video data;

providing the sequence of absolute coded pixel segments and relative coded pixel segments to the remote computer; and sending only a part of each video line from the beginning of the line to a right margin point, where the right margin point is defined as the last pixel of the line to differ from corresponding pixel in the corresponding line and in the prior frame by more than a programmable threshold amount, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0, 1), then (1, 0, 0, −2, 0, 0, 1), and so on up to a maximum segment length.

15. In a wireless keyboard-video-mouse ("KVM") system in which a remote computer accesses the video output data of a target computer, a method of providing video data from the target computer to the remote computer, wherein the video data represents sequences of video frames, each frame comprising a sequence of video lines, the method comprising:

compressing in a video compressor at least some of the video data using a line fitting compression scheme to produce at least one sequence of absolute coded pixel segments and relative coded pixel segments which combine to represent the video data;

providing the sequence of absolute coded pixel segments and relative coded pixel segments to the remote computer; and sending only a part of each video line from a left margin point to a right margin point, where the left margin point is defined as the first pixel of the video line to differ from the corresponding pixel in the corresponding line and in the prior frame by more than a programmable threshold amount, and the right margin point is defined as the last pixel of the video line to differ from the corresponding pixel in the corresponding line and in the prior frame by more than the programmable threshold amount, wherein the video data represent red, green and blue (RGB) pixel components and wherein a segment is formed to be as long as possible such that the curvature of each of the red, green, and blue component values that form the segment is constrained to be less than a threshold, and wherein the measure of curvature is the magnitude of the output of a finite impulse response filter with coefficients (1, −2, 1) applied to the RGB pixel component values forming each segment, and wherein the curvature is measured as the magnitude of the output of each of a set of finite impulse response filters with coefficients (1, −2, 1) and other filter coefficients derived from said finite impulse response filter by interspersing zeros, specifically producing first (1, 0, −2, 0, 1), then (1, 0, 0, −2, 0, 0, 1), and so on up to a maximum segment length.

16. A method as in any one of claims 13, 14 and 15 wherein the pixel difference is computed according to the city-block distance metric.

\* \* \* \* \*